US012372427B2

(12) United States Patent
Gál et al.

(10) Patent No.: US 12,372,427 B2
(45) Date of Patent: Jul. 29, 2025

(54) HANDHELD ULTRASONIC TESTING DEVICE

(71) Applicant: Honeywell International Inc., Charlotte, NC (US)

(72) Inventors: Petr Gál, Brno (CZ); Jan Adamek, Brno (CZ); Milos Koutny, Brno (CZ); David Cada, Brno (CZ); Michal Bohuš, Trečín (SK); Rodney Royston Watts, Wimborne (GB)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/733,038

(22) Filed: Jun. 4, 2024

(65) Prior Publication Data
US 2024/0319036 A1 Sep. 26, 2024

Related U.S. Application Data

(62) Division of application No. 17/548,961, filed on Dec. 13, 2021, now Pat. No. 12,031,884, which is a
(Continued)

(51) Int. Cl.
*G01M 3/24* (2006.01)
*G01M 3/00* (2006.01)
(Continued)

(52) U.S. Cl.
CPC ............. *G01M 3/24* (2013.01); *G01M 3/007* (2013.01); *G05G 1/02* (2013.01); *G05G 1/08* (2013.01);
(Continued)

(58) Field of Classification Search
CPC .. G01M 3/007; G01M 3/24; G01N 2291/021; G01N 29/226; G05G 1/02
See application file for complete search history.

(56) References Cited

U.S. PATENT DOCUMENTS 4,001,817 A   1/1977 Squires
4,091,383 A   5/1978 Rainville
(Continued)

FOREIGN PATENT DOCUMENTS

DE    3405171 A1    8/1985
DE    3618785 A1    12/1987
EP    1548352 A3    8/2006

OTHER PUBLICATIONS

U.S. Appl. No. 17/548,961, filed Dec. 13, 2021, U.S. Pat. No. 12,031,884, Issued.
(Continued)

*Primary Examiner* — David L Singer
(74) *Attorney, Agent, or Firm* — Alston & Bird LLP

(57) ABSTRACT

Methods for manufacturing an apparatus for testing an ultrasonic gas leak detection device and methods for testing an ultrasonic gas leak detection device are disclosed. An example method includes disposing a rotary selector around a housing, disposing a rotary position sensing device within the housing, disposing a button on the housing, and disposing an ultrasonic transduction device within the housing, wherein the ultrasonic transduction device is configured to generate a first ultrasonic signal for testing the ultrasonic gas leak detection device when the first rotary position corresponds to the first testing mode and the button simultaneously corresponds to the depressed state, and generate a second ultrasonic signal for testing the ultrasonic gas leak detection device when the second rotary position corresponds to the second testing mode and the button simultaneously corresponds to the depressed state, wherein the second ultrasonic signal is different from the first ultrasonic signal.

20 Claims, 13 Drawing Sheets

Related U.S. Application Data division of application No. 16/376,705, filed on Apr. 5, 2019, now Pat. No. 11,226,256.

(51) Int. Cl.
 *G01N 29/22* (2006.01)
 *G05G 1/02* (2006.01)
 *G05G 1/08* (2006.01)

(52) U.S. Cl.
 CPC ..... *G01N 29/226* (2013.01); *G01N 2291/021* (2013.01)

(56) References Cited

U.S. PATENT DOCUMENTS

| | | |
|---|---|---|
| 4,287,581 A | 9/1981 | Neale, Sr. |
| 4,566,085 A | 1/1986 | Weinberg |
| 4,640,121 A | 2/1987 | Leuker et al. |
| 4,658,386 A | 4/1987 | Morris |
| 4,689,776 A | 8/1987 | Thorndyke et al. |
| 4,782,432 A | 11/1988 | Coffman |
| 5,134,876 A | 8/1992 | Robertson et al. |
| 5,214,411 A | 5/1993 | Herbruck |
| 5,363,689 A | 11/1994 | Hoffmann et al. |
| 5,408,867 A | 4/1995 | Kunze et al. |
| 5,606,305 A | 2/1997 | Jan |
| 5,724,919 A | 3/1998 | Boyd et al. |
| 6,285,287 B1 | 9/2001 | Jones et al. |
| 6,388,390 B2 | 5/2002 | Rachwal |
| 6,615,770 B2 | 9/2003 | Patterson et al. |
| 7,243,034 B2 | 7/2007 | Fujita et al. |
| D578,601 S | 10/2008 | Jan |
| 7,540,183 B2 | 6/2009 | Komninos |
| 7,841,291 B1 | 11/2010 | Milanovich |
| 8,096,674 B2 | 1/2012 | Matthews et al. |
| 8,737,169 B1 | 5/2014 | Dewitt et al. |
| D708,796 S | 7/2014 | Sproviero et al. |
| 9,295,230 B1 | 3/2016 | Beck |
| 9,506,833 B2 | 11/2016 | Huseynov et al. |
| 9,603,572 B2 | 3/2017 | Knoefel |
| 10,180,371 B2 | 1/2019 | Duerr et al. |
| D896,339 S | 9/2020 | Zhuo |
| 2003/0209077 A1 | 11/2003 | Battenberg et al. |
| 2004/0262410 A1 | 12/2004 | Hull |
| 2006/0191341 A1 | 8/2006 | Olesen et al. |
| 2006/0212240 A1 | 9/2006 | Fujita et al. |
| 2007/0107488 A1 | 5/2007 | Farrell |
| 2008/0036594 A1 | 2/2008 | Kates |
| 2008/0049433 A1 | 2/2008 | Sharrah et al. |
| 2008/0218998 A1 | 9/2008 | Quest et al. |
| 2008/0310254 A1 | 12/2008 | Piel et al. |
| 2009/0038664 A1 | 2/2009 | Juslin et al. |
| 2009/0060246 A1 | 3/2009 | Baliga et al. |
| 2009/0248580 A1 | 10/2009 | Baentsch et al. |
| 2010/0270469 A1 | 10/2010 | Johnson et al. |
| 2010/0277295 A1 | 11/2010 | Matthews et al. |
| 2011/0032116 A1 | 2/2011 | Tsui et al. |
| 2011/0120209 A1 | 5/2011 | Rose et al. |
| 2012/0115101 A1 | 5/2012 | Rauchenzauner et al. |
| 2012/0194973 A1 | 8/2012 | Baliga et al. |
| 2013/0163388 A1 | 6/2013 | Hermann |
| 2013/0166227 A1 | 6/2013 | Hermann et al. |
| 2014/0000347 A1 | 1/2014 | Huseynov et al. |
| 2014/0005958 A1 | 1/2014 | Baliga |
| 2014/0375335 A1 | 12/2014 | Winso et al. |
| 2015/0216160 A1 | 8/2015 | Spence |
| 2015/0276540 A1 | 10/2015 | Huseynov et al. |
| 2016/0197502 A1 | 7/2016 | Waters et al. |
| 2017/0321876 A1 | 11/2017 | Johnson et al. |
| 2018/0065233 A1 | 3/2018 | Seith et al. |

OTHER PUBLICATIONS

U.S. Appl. No. 16/376,705, filed Apr. 5, 2019, U.S. Pat. No. 11,226,256, Issued.
CA Notice of Allowance Mailed on Mar. 3, 2023 for CA Application No. 3077860, 1 page(s).
CA Notice of Allowance Mailed on Mar. 9, 2022 for CA Application No. 3077860, 1 page(s).
CA Office Action Mailed on May 27, 2021 for CA Application No. 3077860, 5 page(s).
Decision to grant a European patent Mailed on Jan. 18, 2024 for EP Application No. 20167854, 2 page(s).
European Search Report Mailed on Aug. 31, 2020 for EP Application No. 20167854.7, 7 page(s).
Examiner Interview Summary Record (PTOL—413) Mailed on Mar. 22, 2024 for U.S. Appl. No. 17/548,961, 1 page(s).
Extended European Search Report Mailed on May 8, 2024 for EP Application No. 24152730, 8 page(s).
Final Rejection Mailed on Nov. 30, 2023 for U.S. Appl. No. 17/548,961, 29 page(s).
Intention to grant Mailed on Sep. 7, 2023 for EP Application No. 20167854, 9 page(s).
Non-Final Rejection Mailed on Aug. 17, 2023 for U.S. Appl. No. 17/548,961, 24 page(s).
Non-Final Rejection Mailed on May 5, 2021 for U.S. Appl. No. 16/376,705, 11 page(s).
Notice of Allowance and Fees Due (PTOL-85) Mailed on Mar. 22, 2024 for U.S. Appl. No. 17/548,961, 8 page (s).
Notice of Allowance and Fees Due (PTOL-85) Mailed on Mar. 9, 2022 for CA Application No. 3077860.
Notice of Allowance and Fees Due (PTOL-85) Mailed on Sep. 15, 2021 for U.S. Appl. No. 16/376,705.
Requirement for Restriction/Election Mailed on Dec. 22, 2020 for U.S. Appl. No. 16/376,705.
Requirement for Restriction/Election Mailed on Jun. 29, 2023 for U.S. Appl. No. 17/548,961, 7 page(s).

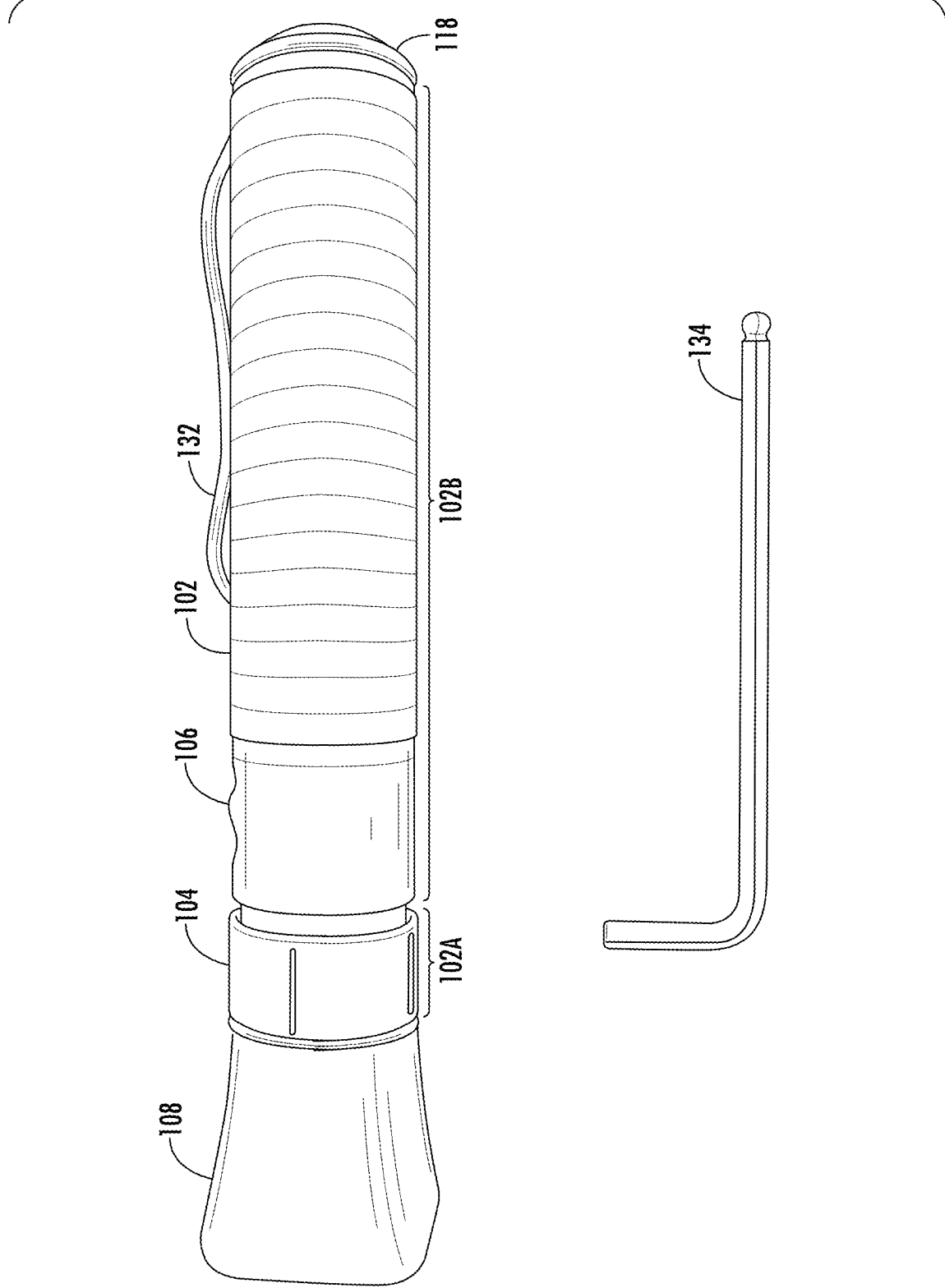

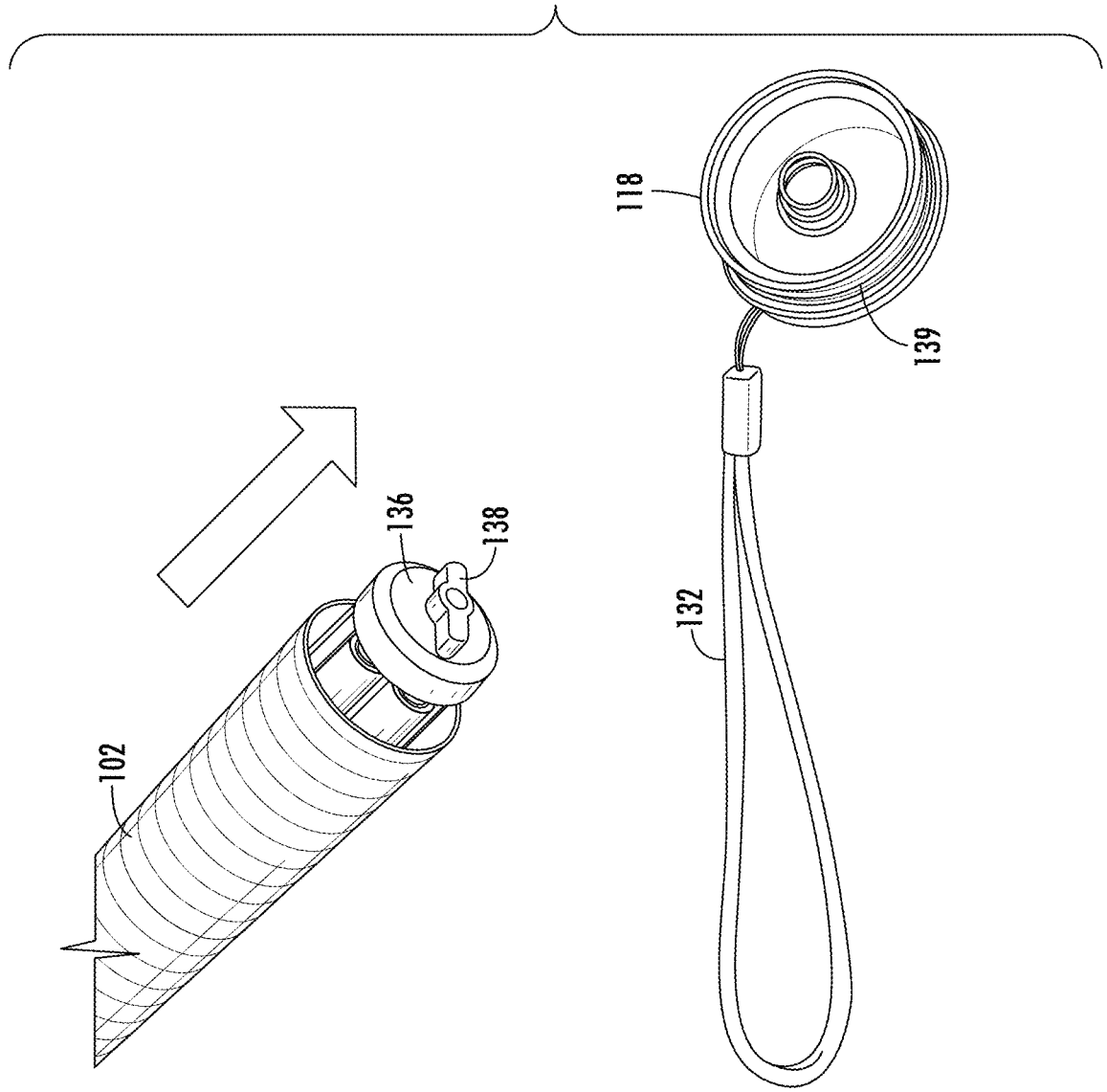

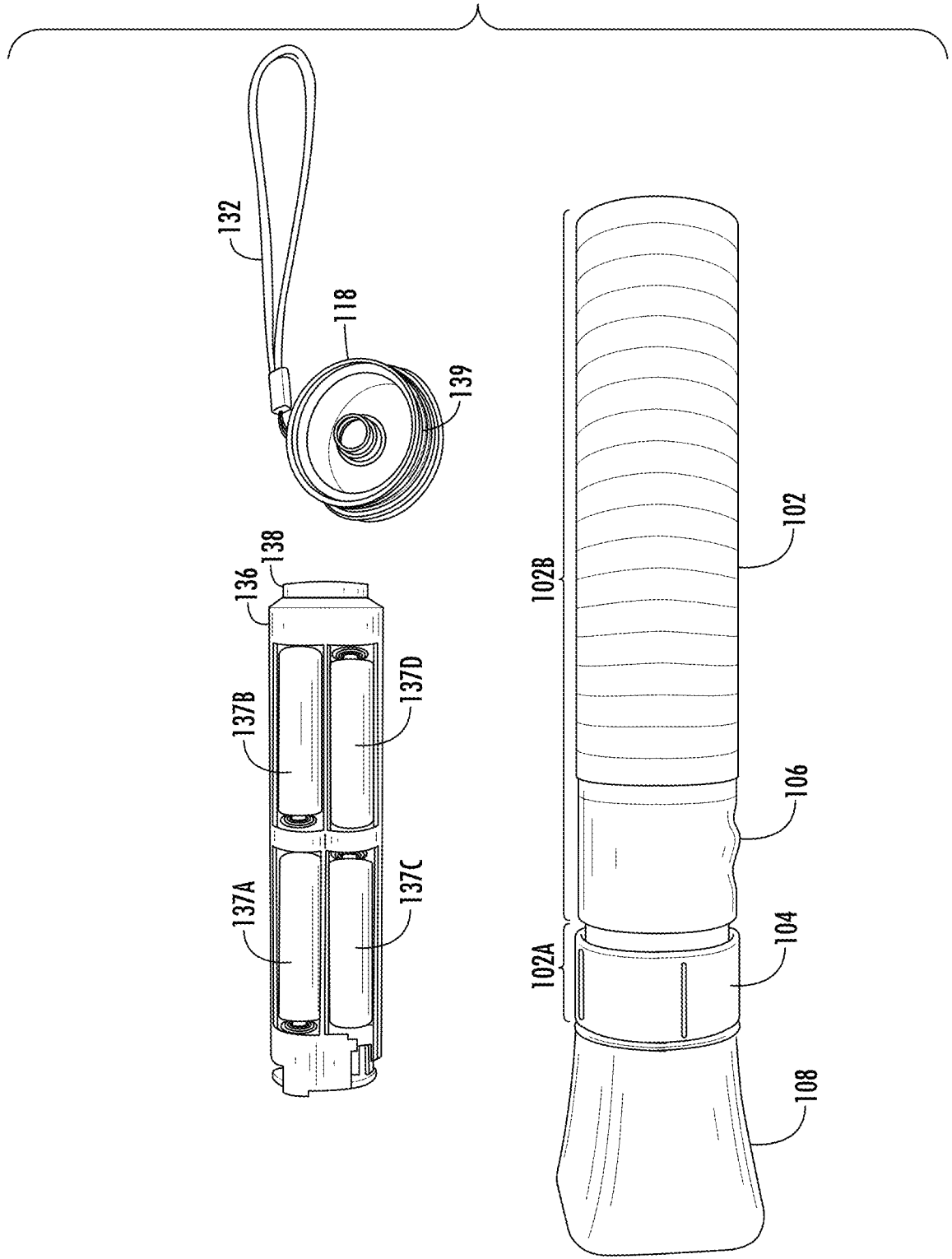

HANDHELD ULTRASONIC TESTING DEVICE

CROSS-REFERENCE TO RELATED APPLICATIONS

The present application is a divisional application of U.S. application Ser. No. 17/548,961, filed Dec. 13, 2021, which is a divisional application of U.S. application Ser. No. 16/376,705, filed Apr. 5, 2019, each of which is incorporated herein by reference in its entirety.

TECHNOLOGICAL FIELD

Example embodiments of the present disclosure relate generally to sensors and, more particularly, to techniques for testing ultrasonic gas leak detectors.

BACKGROUND

Industrial and commercial applications, including pressurized gas installations and processes, are increasingly utilizing gas leak sensors to detect gas leaks. However, conventional gas leak sensor designs cannot safely test those gas leak sensors using a portable test unit.

Applicant has identified a number of deficiencies and problems associated with conventional gas leak sensors. Through applied effort, ingenuity, and innovation, many of these identified problems have been solved by developing solutions that are included in embodiments of the present disclosure, many examples of which are described in detail herein.

SUMMARY

Systems, apparatuses, methods, and computer program products are disclosed herein for providing for a handheld ultrasonic testing device for testing an ultrasonic gas leak detection device having testing mode that is selectable between a first testing mode (e.g., a test mode) and a second testing mode (e.g., an alarm mode).

In one example embodiment, an apparatus is provided for testing an ultrasonic gas leak detection device. The apparatus may comprise a housing comprising an inner surface and an outer surface disposed opposite the inner surface. The apparatus may further comprise a rotary selector disposed around an outer portion of the outer surface of the housing. The apparatus may further comprise a rotary position sensing device encompassed within a first inner portion of the inner surface of the housing. The rotary position sensing device may be configured to determine a rotary position of the rotary selector. The rotary position of the rotary selector may correspond to a first testing mode for testing the ultrasonic gas leak detection device or a second testing mode for testing the ultrasonic gas leak detection device. The apparatus may further comprise an ultrasonic transduction device encompassed within a second inner portion of the inner surface of the housing. The ultrasonic transduction device may be configured to, in response to a first determination by the rotary position sensing device that the rotary position of the rotary selector corresponds to the first testing mode, generate a first ultrasonic signal for testing the ultrasonic gas leak detection device. The ultrasonic transduction device may be configured to, in response to a second determination by the rotary position sensing device that the rotary position of the rotary selector corresponds to the second testing mode, generate a second ultrasonic signal for testing the ultrasonic gas leak detection device. The second ultrasonic signal may be different from the first ultrasonic signal.

In another example embodiment, a method is provided for manufacturing an apparatus for testing an ultrasonic gas leak detection device. The method may comprise providing a housing comprising an inner surface and an outer surface disposed opposite the inner surface. The method may further comprise disposing a rotary selector around an outer portion of the outer surface of the housing. The method may further comprise disposing a rotary position sensing device within a first inner portion of the inner surface of the housing. The rotary position sensing device may be configured to determine a rotary position of the rotary selector. The rotary position of the rotary selector may correspond to a first testing mode for testing the ultrasonic gas leak detection device or a second testing mode for testing the ultrasonic gas leak detection device. The method may further comprise disposing an ultrasonic transduction device within a second inner portion of the inner surface of the housing. The ultrasonic transduction device may be configured to, in response to a first determination by the rotary position sensing device that the rotary position of the rotary selector corresponds to the first testing mode, generate a first ultrasonic signal for testing the ultrasonic gas leak detection device. The ultrasonic transduction device may be further configured to, in response to a second determination by the rotary position sensing device that the rotary position of the rotary selector corresponds to the second testing mode, generate a second ultrasonic signal for testing the ultrasonic gas leak detection device. The second ultrasonic signal may be different from the first ultrasonic signal.

In yet another example embodiment, a method is provided for testing an ultrasonic gas leak detection device. The method may comprise determining, by rotary position sensing circuitry of a handheld ultrasonic testing device, a rotary position of a rotary selector of the handheld ultrasonic testing device. The method may further comprise determining, by testing mode determination circuitry of the handheld ultrasonic testing device, whether the rotary position of the rotary selector corresponds to a first testing mode for testing the ultrasonic gas leak detection device or a second testing mode for testing the ultrasonic gas leak detection device. The method may further comprise, in response to determining that the rotary position of the rotary selector corresponds to the first testing mode, generating, by ultrasonic transduction circuitry of the handheld ultrasonic testing device, a first ultrasonic signal for testing the ultrasonic gas leak detection device. The method may further comprise, in response to determining that the rotary position of the rotary selector corresponds to the second testing mode, generating, by the ultrasonic transduction circuitry, a second ultrasonic signal for testing the ultrasonic gas leak detection device. The second ultrasonic signal may be different from the first ultrasonic signal.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which illustrate example embodiments and features of the present disclosure and are not necessarily drawn to scale. It will be understood that the components and structures illustrated in the drawings may or may not be present in various embodiments of the disclosure described herein. Accordingly, some embodiments or features of the present disclosure may include fewer or more components or structures than those shown in the drawings while not departing from the scope of the disclosure.

DETAILED DESCRIPTION

Figure 1A:
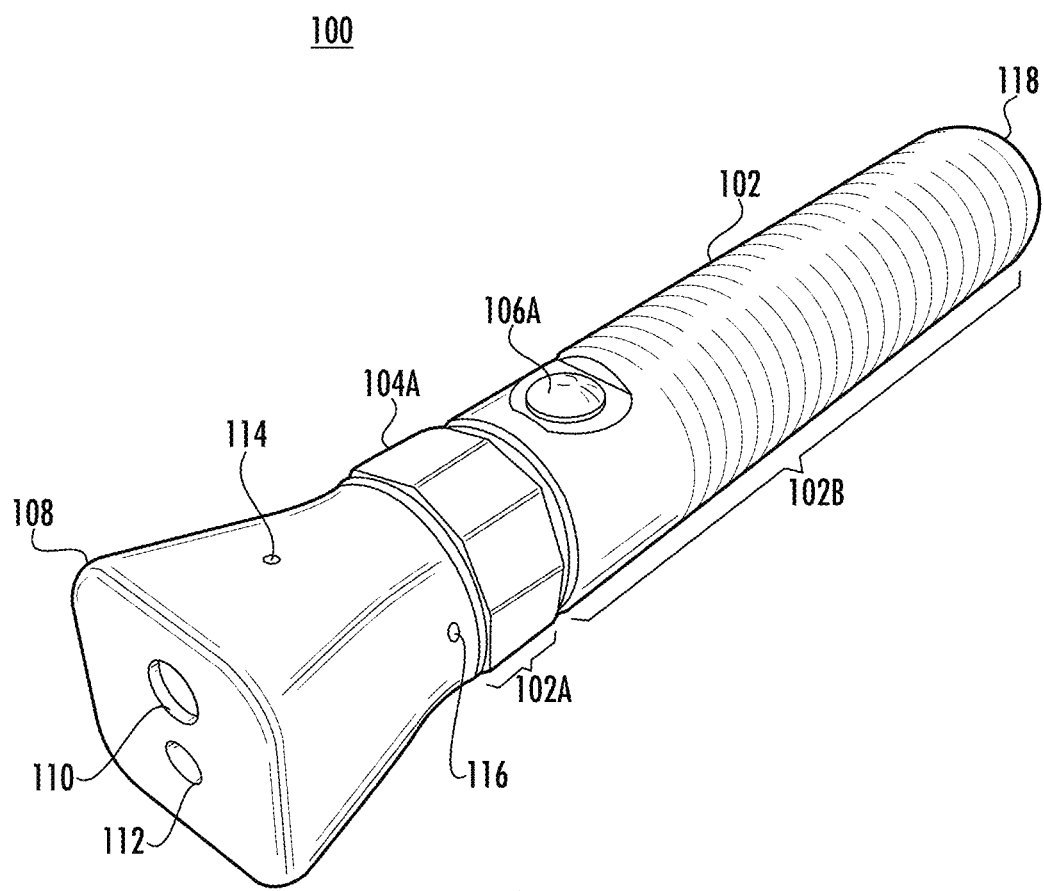
FIGS. 1A, 1B, 1C, 1D, 1E, IF, 1G, and 1H illustrate example isometric views of an example handheld ultrasonic testing device in accordance with some example embodiments described herein.

The following description should be read with reference to the drawings wherein like reference numerals indicate like elements throughout the several views. The detailed description and drawings show several embodiments which are meant to be illustrative of the disclosure. It should be understood that any numbering of disclosed features (e.g., first, second, etc.) and/or directional terms used in conjunction with disclosed features (e.g., front, back, under, above, etc.) are relative terms indicating illustrative relationships between the pertinent features.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The word "example," when used herein, is intended to mean "serving as an example, instance, or illustration." Any implementation described herein as an "example" is not necessarily preferred or advantageous over other implementations.

The ability to detect a gas leak from pressurized gas installations or processes in which there is pressurized gas is an important safety feature. This is especially so in industrial applications such as the oil and gas vertical, upstream and downstream. A gas leak from such installations produces a broadband acoustic signal in the range of audible and ultrasonic frequencies, which is one of the detection methods for such leaks. The detection of gas leaks based on acoustic detection has a number of advantages in comparison with the alternative types of gas detection which rely on the physical contact (e.g., proximity) with the gas molecules of the leak. This is especially true in windy conditions, when the gas leak plume may be directed away from the other types of gas detection. The main challenges for the acoustic detection of gas leaks arise from various alternative sources of an acoustic signal, which may lead to false alarms and decreased range of detection.

A typical industrial gas installation may have various operating machines which will produce various audible signals. However, these frequencies experience strong attenuation in the atmosphere (e.g., 0.5-3.0 decibels per meter (dB/m)) and thus the background signal level for the ultrasonic frequency range above 20 kilohertz (kHz) is usually quite low. This environmental characteristic is one of the main reasons that fixed gas leak detection devices operate in the ultrasonic frequency range even though the detection range in the atmosphere may be below 50 meters. However, a need exists for a portable test unit configured to test these fixed ultrasonic gas leak detectors, where the portable test unit has two modes (e.g., a test mode and an alarm mode), an intrinsically safe housing, a removable battery pack, and two handed operation for activation of the alarm mode (e.g., to improve safety and prevent accidental alarm activation). The disclosure solves the problems described above by providing unique designs for a handheld ultrasonic testing device for testing an ultrasonic gas leak detection device as described in further detail below.

Example embodiments described herein provide systems, apparatuses, and methods for a handheld ultrasonic testing device for testing an ultrasonic gas leak detection device. In some embodiments, the embodiments disclosed herein provide for an intrinsically safe housing for a handheld ultrasonic testing device for an ultrasonic gas leak detector. In some embodiments, the electronic components and circuitries of the handheld ultrasonic testing device are placed and intrinsically sealed in a safe housing. In some embodiments, the embodiments disclosed herein further provide for a removable battery pack for the handheld ultrasonic testing device.

In some embodiments, the embodiments disclosed herein further provide for two modes of operation of the handheld ultrasonic testing device: a test mode (e.g., the first testing mode described herein); and an alarm mode (e.g., the second testing mode described herein). In some embodiments, the handheld ultrasonic testing device described herein may provide for the two modes of operation described herein using: a Hall effect sensor disposed within the housing of the handheld ultrasonic testing device; a Hall effect switch coupled to the Hall effect sensor and disposed within the housing of the handheld ultrasonic testing device; and a rotary selector magnet fixed in a rotary selector disposed around the housing of the handheld ultrasonic testing device. In some embodiments, the Hall effect switch may remain switched on when the Hall effect sensor senses that the rotary selector magnet of the rotary selector is positioned at the base position (e.g., a neutral or un-rotated rotary position). In some embodiments, the rotary selector may be spring loaded to bias the rotary selector towards the base position, allow applied rotation in a counterclockwise direction, and, once the applied rotation ends, automatically return to the base position in a clockwise direction. In some embodiments, the Hall effect switch may be switched off when the Hall effect sensor senses that the rotary selector magnet of the rotary selector is positioned at a rotated position (e.g., a rotated rotary position of about 90 degrees).

In some embodiments, the test mode may remain active while the Hall effect switch is switched on, and the alarm mode may be activated when the Hall effect switch is switched off to avoid unintended activation of the alarm mode by magnetic field noise from the environment.

In some embodiments, the embodiments disclosed herein further provide for two handed operation of the handheld ultrasonic testing device for activating the alarm testing mode (e.g., the alarm mode may be activated by a user only by using both of the user's hands to avoid unconscious or unintended activation of the alarm state of the ultrasonic gas leak detection device). In some embodiments, the test mode may be activated when the user momentarily depresses a push button (e.g., a one handed push and hold function) of the handheld ultrasonic testing device and, once the test mode has been activated, trigger a light emitting diode (LED) signalization of the ultrasonic gas leak detection device. In some embodiments, the alarm mode may be activated when the user momentarily depresses the push button of the handheld ultrasonic testing device with one hand and simultaneously rotates the rotary selector of the handheld ultrasonic testing device with the other hand and, once the test mode has been activated, trigger an alarm state of the ultrasonic gas leak detection device.

In some embodiments, the embodiments disclosed herein further provide for an ultrasonic transduction device (e.g., an ultrasound transducer), an audible transduction device (e.g., a piezoelectric buzzer), and a visual transduction device (e.g., one or more LEDs, such as a green LED, a red LED, any other suitable LED, or any combination thereof) for respectively providing ultrasonic (e.g., above the limit of human hearing, such as above 20 kHz), audible (e.g., within the audible limits of human hearing, such as between about 20 Hz and about 20 kHz), and visual (e.g., within the visible limits of human sight, such as between about 380 nanometers (nm) and about 740 nm) signals corresponding to the two modes of operation of the handheld ultrasonic testing device.

In some embodiments, when the test mode is activated (e.g., when the user presses a button while a rotary selector is at a base, neutral, or un-rotated rotary position): the ultrasonic transduction device may generate a test mode ultrasonic signal for testing the ultrasonic gas leak detection device without activating an alarm or safety system shutdown; the audible transduction device may generate a test mode audible signal (e.g., a lower volume buzzing sound, a lower frequency beeping sound) configured to alert the user that the test mode is active and the ultrasonic transduction device is generating the test mode ultrasonic signal; and the visual transduction device may generate a test mode visual signal (e.g., a green light generated by activation of a green LED) configured to alert the user that the test mode is active and the ultrasonic transduction device is generating the test mode ultrasonic signal.

In some embodiments, when the alarm mode is activated (e.g., when the user rotates a rotary selector about 90 degrees and simultaneously presses a button): the ultrasonic transduction device may generate an alarm mode ultrasonic signal for testing the ultrasonic gas leak detection device by causing the ultrasonic gas leak detection device to activate a safety shutdown system in communication with the ultrasonic gas leak detection device (e.g., by causing the ultrasonic gas leak detection device to generate a safety shutdown control signal such as an alarm system activation or deactivation signal, a sprinkler system activation or deactivation signal, any other suitable signal, or any combination thereof); the audible transduction device may generate an alarm mode audible signal (e.g., a higher volume buzzing sound, a higher frequency beeping sound) configured to alert the user that the alarm mode is active and the ultrasonic transduction device is generating the alarm mode ultrasonic signal; and the visual transduction device may generate an alarm mode visual signal (e.g., a constant or blinking orange light generated by simultaneous activation of a green LED and a red LED) configured to alert the user that the alarm mode is active and the ultrasonic transduction device is generating the alarm mode ultrasonic signal.

In some embodiments, the modulation, frequency, amplitude, any other suitable characteristic, or any combination thereof of the test mode ultrasonic signal and the alarm mode ultrasonic signal may be different. In some embodiments, the modulation, frequency, amplitude, any other suitable characteristic, or any combination thereof of the test mode audible signal and the alarm mode audible signal may be different. In some embodiments, the intensity, color (e.g., wavelength), frequency, any other suitable characteristic, or any combination thereof of the test mode visual signal and the alarm mode visual signal may be different.

There are many advantages of the embodiments disclosed herein, such as: providing an intrinsically safe housing for a handheld ultrasonic testing device; providing a test mode of operation for a handheld ultrasonic testing device that a user may activate using one hand (e.g., by pressing a button); providing an alarm mode of operation for a handheld ultrasonic testing device that a user may activate only using two hands (e.g., by rotating a rotary selector and pressing a button) to avoid unconscious or unintended activation of the alarm state of the ultrasonic gas leak detection device; and providing a removable battery pack for the handheld ultrasonic testing device.

Although the disclosure describes the features of the handheld ultrasonic testing device disclosed herein with reference to an ultrasonic gas leak detector, the handheld ultrasonic testing device disclosed herein may be used to test in any suitable sensor, detector, gauge, instrument, or application where acoustic detection is utilized, utilizable, or otherwise desirable.

FIGS. 1A, 1B, 1C, 1D, 1E, IF, 1G, and 1H illustrate example isometric views of an example handheld ultrasonic testing device 100 for testing an ultrasonic gas leak detection device in accordance with some example embodiments described herein. In some embodiments, the example handheld ultrasonic testing device 100 may be configured to test an ultrasonic gas leak detection device located up to 50 meters away from the example handheld ultrasonic testing device 100.

In some embodiments, the example handheld ultrasonic testing device 100 may comprise a housing 102 comprising an inner surface and an outer surface disposed opposite the inner surface. In some embodiments, the housing 102 may comprise anodized aluminum, plastic, or a combination thereof. In some embodiments, the electronic components and circuitries of the example handheld ultrasonic testing device 100 may be disposed and intrinsically sealed in the housing 102.

In some embodiments, the example handheld ultrasonic testing device 100 may further comprise a rotary selector 104 disposed around a first outer portion 102A of the outer surface of the housing 102. In some embodiments, the example handheld ultrasonic testing device 100 may further comprise a rotary selector spring disposed around the first outer portion 102A of the housing 102 and an inner surface of the rotary selector 104. In some embodiments, the rotary selector 104 may be spring loaded by the rotary selector spring to bias the rotary selector 104 towards the un-rotated rotary position 104A (shown in FIGS. 1A and 1B), allow positive applied rotation in a counterclockwise direction to rotate the rotary selector 104 to the rotated rotary position 104B (shown in FIG. 1C), and, once the positively applied rotation ends, automatically return the rotary selector 104 to the un-rotated rotary position 104A in a clockwise direction. In some embodiments, the rotary selector spring may be configured to preload the rotary selector 104 such that the un-rotated rotary position 104A of the rotary selector 104 corresponds to the first testing mode and the rotated rotary position 104B of the rotary selector 104 corresponds to the second testing mode. In some embodiments, an angular difference between the un-rotated rotary position of the rotary selector and the rotated rotary position of the rotary selector may be about 90 degrees.

In some embodiments, the example handheld ultrasonic testing device 100 may further comprise a button 106 disposed through a first subportion of a second outer portion 102B of the outer surface of the housing 102. In some embodiments, the button 106 may be biased towards an un-depressed state 106A (shown in FIG. 1A), allow positive applied force in a downward direction to press the button 106 to the depressed state 106B (shown in FIGS. 1B and 1C), and, once the positively applied force ends, automatically return the button 106 to the un-depressed state 106A in an upward direction. In some embodiments, the example handheld ultrasonic testing device 100 may further comprise a flexible rubber grip disposed around a second subportion of the second outer portion 102B of the outer surface of the housing 102 to provide for an improved gripping surface for the user's hand.

In some embodiments, the example handheld ultrasonic testing device 100 may further comprise a rotary position sensing device encompassed within a first inner portion of the inner surface of the housing 102. In some embodiments, the rotary position sensing device may be configured to determine a rotary position of the rotary selector 104. In some embodiments, the rotary position sensing device may comprise a Hall effect sensor coupled to a Hall effect switch via a substrate (e.g., a printed circuit board (PCB)). In some embodiments, the example handheld ultrasonic testing device 100 may further comprise a rotary selector magnet attached (e.g., using a two-part epoxy resin) to an inner surface of the rotary selector 104. In some embodiments, the Hall effect switch may remain switched on when the Hall effect sensor senses that the rotary selector magnet of the rotary selector 104 is positioned at the un-rotated rotary position 104A. In some embodiments, the Hall effect switch may be switched off when the Hall effect sensor senses that the rotary selector magnet of the rotary selector 104 is positioned at a rotated rotary position 104B. In some embodiments, the rotated rotary position 104B may be about 90 degrees counterclockwise from the un-rotated rotary position 104A. In some embodiments, the first testing mode may remain active while the Hall effect switch is switched on, and the second testing mode may be activated when the Hall effect switch is switched off to avoid unintended activation of the second testing mode by magnetic field noise from the environment.

In some embodiments, the example handheld ultrasonic testing device 100 may further comprise an ultrasonic transduction device (e.g., an ultrasound transducer) disposed within a second inner portion of the inner surface of the housing 102. In some embodiments, the example handheld ultrasonic testing device 100 may further comprise an audible transduction device (e.g., a piezoelectric buzzer) disposed within a third inner portion of the inner surface of the housing 102. In some embodiments, the example handheld ultrasonic testing device 100 may further comprise an visual transduction device 114 (e.g., one or more LEDs, such as a green LED, a red LED, any other suitable LED, or any combination thereof) disposed within a third inner portion of the inner surface of the housing 102 and visible through an aperture defined by the housing 102. In some embodiments, the ultrasonic transduction device, the audible transduction device, and the visual transduction device 114 may respectively provide ultrasonic (e.g., above the limit of human hearing, such as above 20 kHz), audible (e.g., within the audible limits of human hearing, such as between about 20 Hz and about 20 kHz), and visual (e.g., within the visible limits of human sight, such as between about 380 nanometers (nm) and about 740 nm) signals corresponding to the first testing mode and the second testing mode.

In some embodiments, the example handheld ultrasonic testing device 100 may comprise a front cap 108 disposed at a front end of the housing 102. In some embodiments, the front cap 108 may comprise a square-shaped cross-sectional area to allow the example handheld ultrasonic testing device 100 to remain rotationally stationary (e.g., to prevent the example handheld ultrasonic testing device 100 from rolling) when placed on a surface such as a shelf, desk, or table. In some embodiments, the front cap 108 may define a first aperture 110 acoustically coupled to the ultrasonic transduction device and a second aperture 112 acoustically coupled to the audible transduction device. In some embodiments, the front cap 108 may be attached to the housing 102 using a fastener 116 (e.g., a countersunk screw or bolt).

Figure 1B:
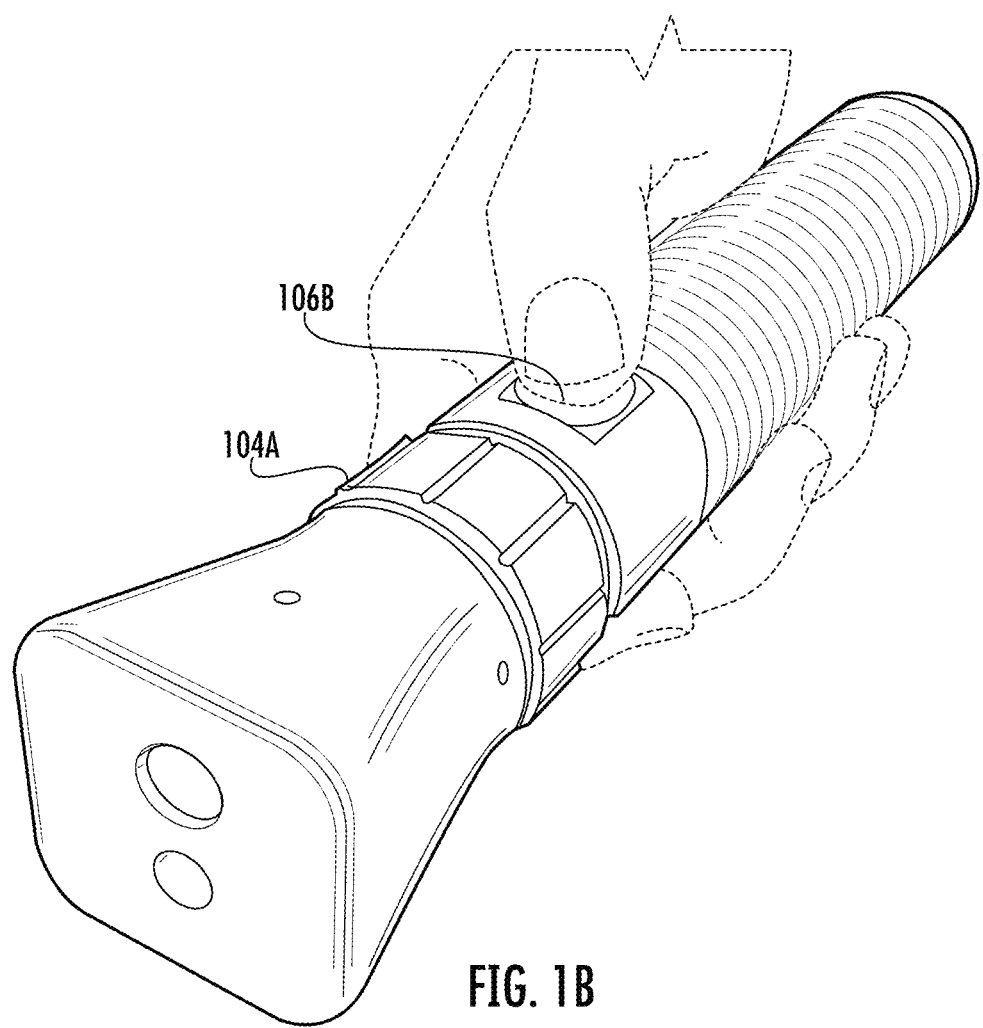
Figure 1C:
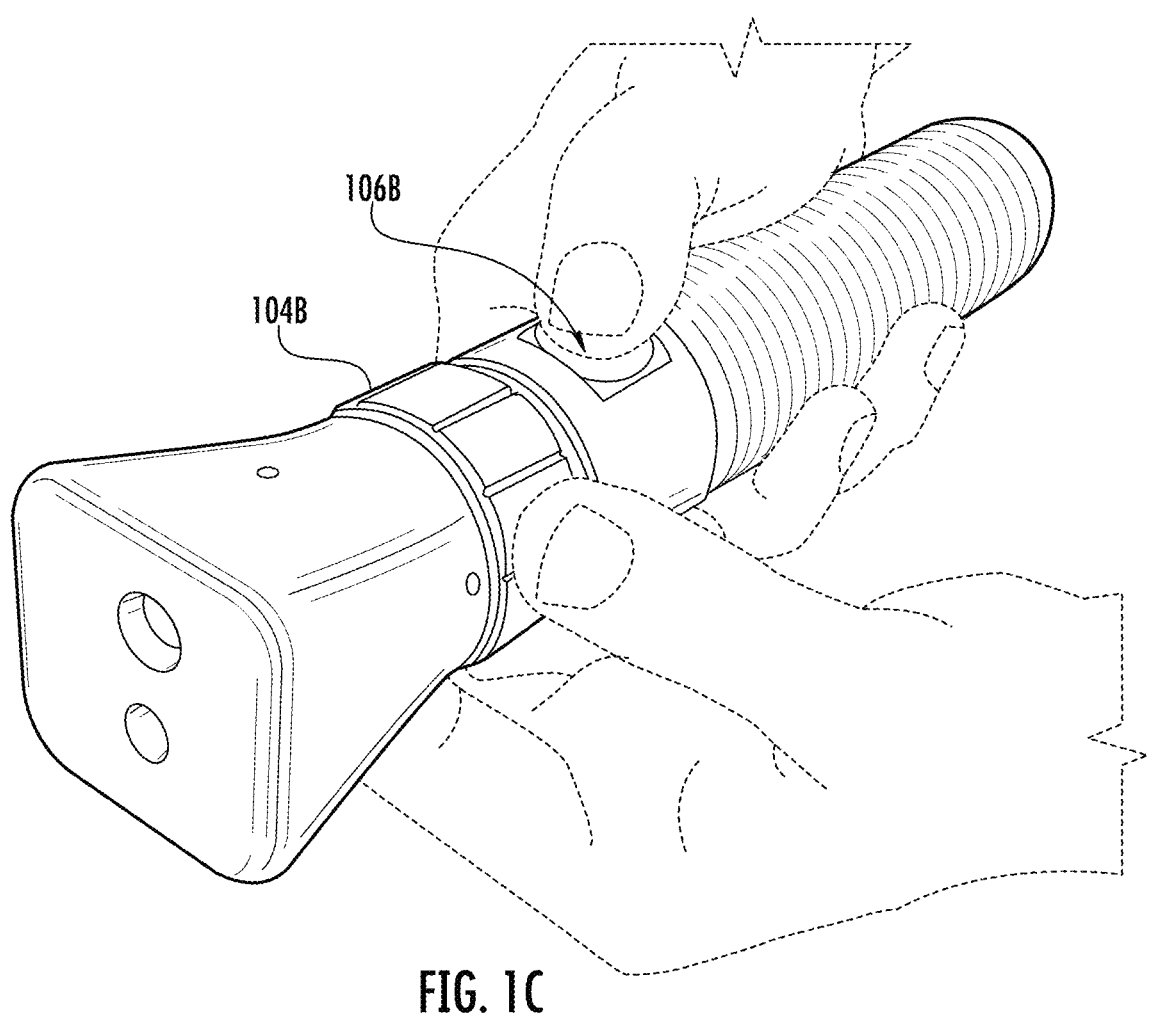
Figure 1E:
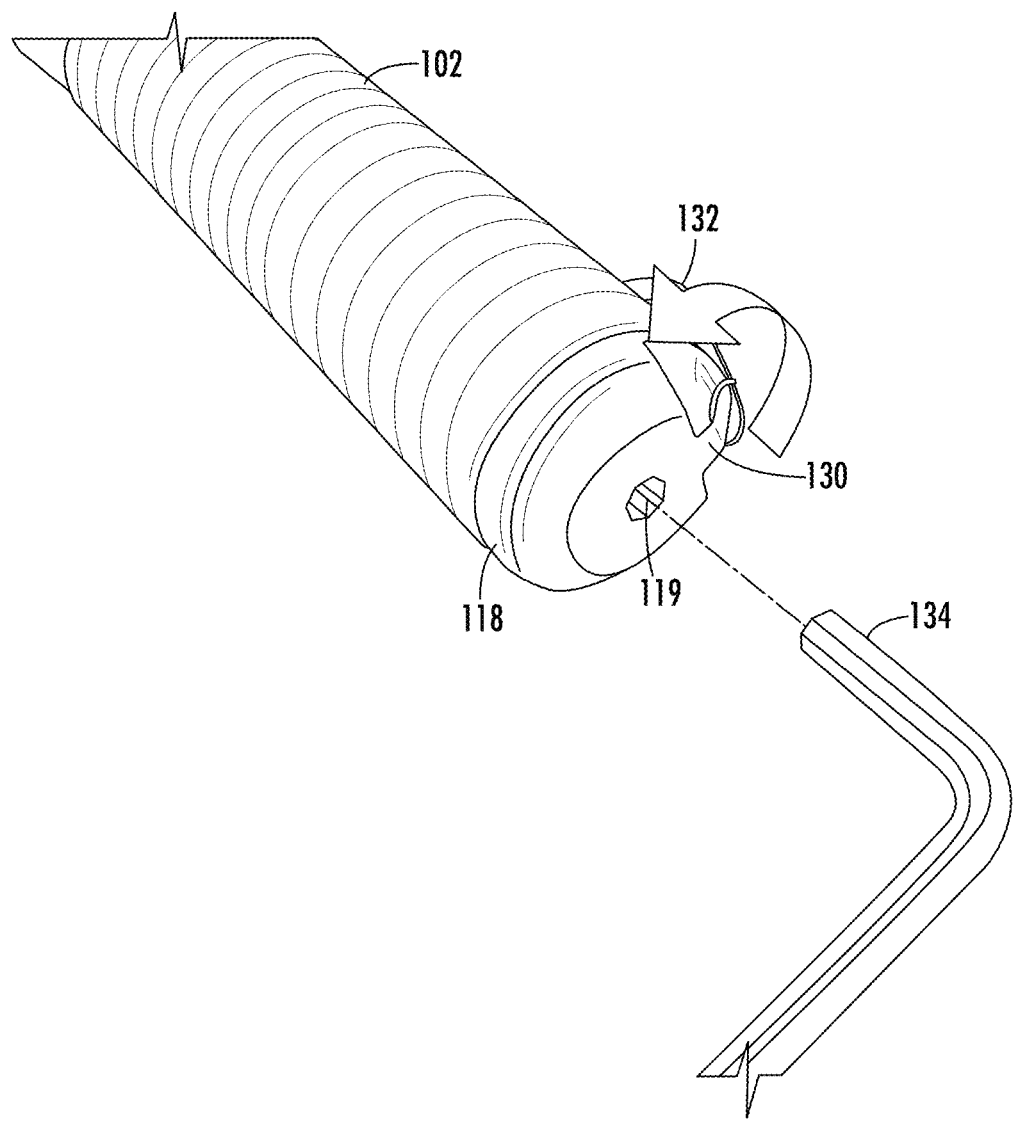

In some embodiments, as shown in FIGS. 1D and 1E, the example handheld ultrasonic testing device 100 may comprise an end cap 118 disposed at a back end of the housing 102. In some embodiments, the end cap 118 may be removably attached to the housing 102. In some embodiments, as shown in FIG. 1E, the end cap 118 may comprise a fixed structure 130 to which a lanyard 132 may be attached. In some embodiments, the end cap may comprise socket 119 (e.g., a 6 millimeter hexagon-shaped socket). In some embodiments, the end cap 118 may be removable from the housing 102 only by operation of the socket. For example, as shown in FIG. 1E, the end cap 118 may be removable from the housing 102 by inserting a portion of the end cap removal tool 134 (e.g., a 6 millimeter hexagon socket key) into the socket 119 and rotating the socket 119 counterclockwise using the end cap removal tool 134.

In some embodiments, as shown in FIGS. 1F and 1G, the example handheld ultrasonic testing device 100 may comprise a removable battery pack 136 disposed within a fourth inner portion of the inner surface of the housing 102. In some embodiments, the removable battery pack 136 may comprise a plurality of removable batteries, such as removable batteries 137A, 137B, 137C, and 137D. In some embodiments, the removable battery pack 136 may comprise ten AAA alkaline batteries. In some embodiments, the removable battery pack 136 may be removable from the housing 102 after removal of the end cap 118 from the housing 102. For example, as shown in FIG. 1F, the removable battery pack 136 may be removable from the housing 102 by pulling on the alignment structure 138 and sliding the removable battery pack 136 out of the housing 102.

Figure 1H:
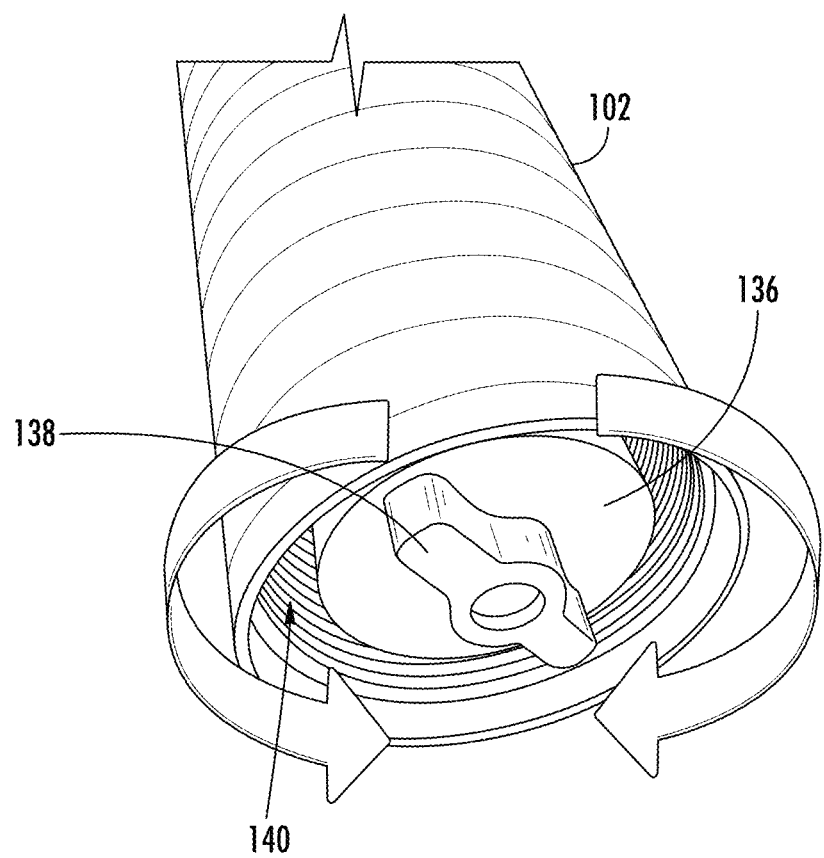

In some embodiments, the end cap 118 may be attachable to the housing 102 after insertion of the removable battery pack 136 into the housing 102. For example, as shown in FIG. 1H, the removable battery pack 136 may be inserted into the housing 102 by sliding a portion of the removable battery pack 136 into the housing 102, pushing on and rotating the alignment structure 138 (e.g., twisting clockwise, counter-clockwise, or both) until the alignment structure 138 is inserted into one or more alignment grooves defined by a subportion of the fourth inner portion of the inner surface of the housing 102, and sliding the remaining portion of the removable battery pack 136 into the housing 102 until the removable battery pack 136 is fully inserted into the housing 102. Subsequently, the end cap 118 may be attached to the housing 102 by inserting a portion of the end cap 118 into the housing 102 until the threading 139 of the end cap 118 mates with the threading 140 of the housing 102, inserting a portion of the end cap removal tool 134 into the socket 119, and rotating the socket 119 clockwise using the end cap removal tool 134 until the end cap 118 is fully attached to the housing 102. In some embodiments, the subportion of the fourth inner portion of the inner surface of the housing 102 may define one or more alignment grooves so that attachment of the end cap 118 is not possible if the removable battery pack 136 is not seated in the correct position in the fourth inner portion of the inner surface of the housing 102.

In some embodiments, the example handheld ultrasonic testing device 100 may provide for two modes of operation: a first testing mode (e.g., a test mode); and a second testing mode (e.g., an alarm mode). In some embodiments, a first rotary position (e.g., the un-rotated rotary position 104A) of the rotary selector 104 may correspond to the first testing mode for testing the ultrasonic gas leak detection device. In some embodiments, the first testing mode, when activated, may be configured to test the ultrasonic gas leak detection device without causing the ultrasonic gas leak detection device to activate a safety shutdown system in communication with the ultrasonic gas leak detection device. In some embodiments, a second rotary position (e.g., the rotated rotary position 104B) of the rotary selector 104 may correspond to the second testing mode for testing the ultrasonic gas leak detection device. In some embodiments, the second ultrasonic signal, when activated, may be configured to test the ultrasonic gas leak detection device by causing the ultrasonic gas leak detection device to activate a safety shutdown system in communication with the ultrasonic gas leak detection device.

In some embodiments, as shown in FIGS. 1A and 1B, the un-rotated rotary position 104A of the rotary selector 104 may correspond to the first testing mode. In some embodiments, as shown in FIG. 1C, the rotated rotary position 104B of the rotary selector 104 may correspond to the second testing mode. In some embodiments, an angular difference between the un-rotated rotary position of the rotary selector and the rotated rotary position of the rotary selector may be about 90 degrees.

In some embodiments, the ultrasonic transduction device may be configured to generate a first ultrasonic signal (e.g., a test mode ultrasonic signal) for testing the ultrasonic gas leak detection device in response to a first determination by the rotary position sensing device that the rotary position of the rotary selector 104 corresponds to the first testing mode and the first testing mode has been activated. In some embodiments, the first ultrasonic signal may be configured to test the ultrasonic gas leak detection device without causing the ultrasonic gas leak detection device to activate a safety shutdown system in communication with the ultrasonic gas leak detection device.

In some embodiments, as shown in FIG. 1B, the ultrasonic transduction device may be configured to generate the first ultrasonic signal in response to a one handed operation of the example handheld ultrasonic testing device 100 by a user of the example handheld ultrasonic testing device 100. For example, the ultrasonic transduction device may be configured to generate the first ultrasonic signal when the rotary position of the rotary selector 104 corresponds to the un-rotated rotary position 104A and the button 106 simultaneously corresponds to a depressed state 106B.

In some embodiments, as shown in FIG. 1B, when the first testing mode is activated (e.g., when the user presses a button 106 to the depressed state 106B while a rotary selector 104 is at the un-rotated rotary position 104A): the ultrasonic transduction device may generate a first ultrasonic signal (e.g., a test mode ultrasonic signal) for testing the ultrasonic gas leak detection device without activating an alarm or safety system shutdown; the audible transduction device may generate a first audible signal (e.g., a test mode audible signal, such as a lower volume buzzing sound, a lower frequency beeping sound) configured to alert the user that the first testing mode is active and the ultrasonic transduction device is generating the first ultrasonic signal; and the visual transduction device 114 may generate a first visual signal (e.g., a test mode visual signal, such as a green light generated by activation of a green LED) configured to alert the user that the first testing mode is active and the ultrasonic transduction device is generating the first ultrasonic signal. In some embodiments, the visual transduction device 114 may comprise a single LED configured to emit light at two or more wavelengths, such as green, red, a combination of green and red (e.g., orange), and any other suitable wavelength.

In some embodiments, the ultrasonic transduction device may be further configured to generate, in response to a second determination by the rotary position sensing device that the rotary position of the rotary selector corresponds to the second testing mode and the second testing mode has been activated, a second ultrasonic signal (e.g., an alarm mode ultrasonic signal) for testing the ultrasonic gas leak detection device, wherein the second ultrasonic signal is different from the first ultrasonic signal. In some embodiments, the second ultrasonic signal may be configured to test the ultrasonic gas leak detection device by causing the ultrasonic gas leak detection device to activate a safety shutdown system in communication with the ultrasonic gas leak detection device. In some embodiments, a first modulation of the first ultrasonic signal may be different than a second modulation of the second ultrasonic signal.

In some embodiments, as shown in FIG. 1C, the ultrasonic transduction device may be configured to generate the second ultrasonic signal only in response to a two handed operation of the example handheld ultrasonic testing device 100 by a user of the example handheld ultrasonic testing device 100. For example, the ultrasonic transduction device may be configured to generate the second ultrasonic signal only when the rotary position of the rotary selector 104 corresponds to the rotated rotary position 104B and the button 106 simultaneously corresponds to the depressed state 106B.

In some embodiments, when the second testing mode is activated (e.g., when the user rotates a rotary selector 104 to the rotated rotary position 104B and simultaneously presses a button 106 to the depressed state 106B): the ultrasonic transduction device may generate an a second ultrasonic signal (e.g., an alarm mode ultrasonic signal) for testing the ultrasonic gas leak detection device by causing the ultrasonic gas leak detection device to activate a safety shutdown system in communication with the ultrasonic gas leak detection device; the audible transduction device may generate an second audible signal (e.g., an alarm mode audible signal, such as a higher volume buzzing sound, a higher frequency beeping sound) configured to alert the user that the second testing mode is active and the ultrasonic transduction device is generating the second ultrasonic signal; and the visual transduction device 114 may generate an second visual signal (e.g., alarm mode visual signal, such as a constant or blinking orange light generated by simultaneous activation of a green LED and a red LED) configured to alert the user that the second testing mode is active and the ultrasonic transduction device is generating the second ultrasonic signal.

In some embodiments, the modulation, frequency, amplitude, any other suitable characteristic, or any combination thereof of the first ultrasonic signal and the second ultrasonic signal may be different. In some embodiments, the modulation, frequency, amplitude, any other suitable characteristic, or any combination thereof of the first audible signal and the second audible signal may be different. In some embodiments, the intensity, color (e.g., wavelength), frequency, any other suitable characteristic, or any combination thereof of the first visual signal and the second visual signal may be different.

Figure 2:
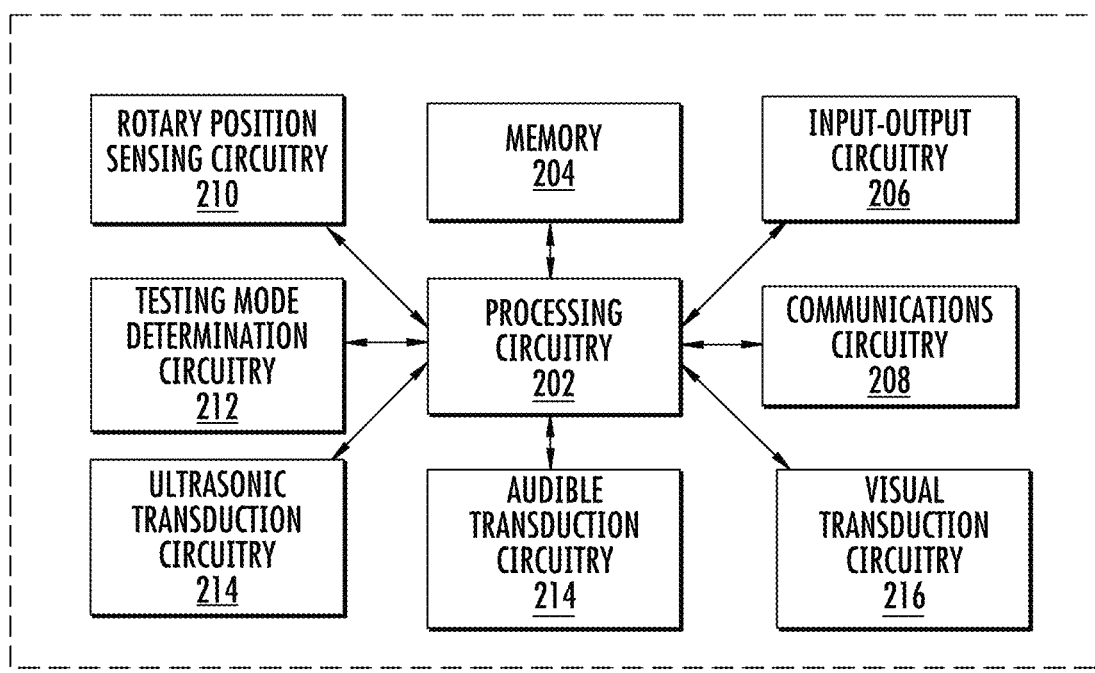
FIG. 2 illustrates an example schematic block diagram in accordance with some example embodiments described herein.

The example handheld ultrasonic testing device 100 described with reference to FIG. 1 may be embodied by one or more computing apparatuses, such as apparatus 200 shown in FIG. 2. As illustrated in FIG. 2, the apparatus 200 may include processing circuitry 202, memory 204, input-output circuitry 206, communications circuitry 208, rotary position sensing circuitry 210, testing mode determination circuitry 212, ultrasonic transduction circuitry 214, audible transduction circuitry 216, and visual transduction circuitry 218. The apparatus 200 may be configured to execute the operations described above with respect to FIG. 1 and below with respect to FIGS. 3, 4, 5, and 6. Although some of these components are described with respect to their functional capabilities, it should be understood that the particular implementations necessarily include the use of particular hardware to implement such functional capabilities. It should also be understood that certain of these components may include similar or common hardware. For example, two sets of circuitry may both leverage use of the same processor, network interface, storage medium, or the like to perform their associated functions, such that duplicate hardware is not required for each set of circuitry.

The use of the term "circuitry" as used herein with respect to components of the apparatus 200 therefore includes particular hardware configured to perform the functions associated with respective circuitry described herein. Of course, while the term "circuitry" should be understood broadly to include hardware, in some embodiments, circuitry may also include software for configuring the hardware. For example, in some embodiments, "circuitry" may include processing circuitry, storage media, network interfaces, input-output devices, and other components. In some embodiments, other elements of the apparatus 200 may provide or supplement the functionality of particular circuitry. For example, the processing circuitry 202 may provide processing functionality, memory 204 may provide storage functionality, and communications circuitry 208 may provide network interface functionality, among other features.

In some embodiments, the processing circuitry 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. For example, the memory 204 may be an electronic storage device (e.g., a computer readable storage medium). In another example, the memory 204 may be a non-transitory computer-readable storage medium storing computer-executable program code instructions that, when executed by a computing system, cause the computing system to perform the various operations described herein. The memory 204 may be configured to store information, data, content, signals applications, instructions (e.g., computer-executable program code instructions), or the like, for enabling the apparatus 200 to carry out various functions in accordance with example embodiments of the present disclosure. It will be understood that the memory 204 may be configured to store partially or wholly any electronic information, data, data structures, embodiments, examples, figures, processes, operations, techniques, algorithms, instructions, systems, apparatuses, methods, or computer program products described herein, or any combination thereof.

The processing circuitry 202 may be embodied in a number of different ways and may, for example, include one or more processing devices configured to perform independently. Additionally or alternatively, the processing circuitry 202 may include one or more processors configured in tandem via a bus to enable independent execution of instructions, pipelining, multithreading, or a combination thereof. The use of the term "processing circuitry" may be understood to include a single core processor, a multi-core processor, multiple processors internal to the apparatus, remote or "cloud" processors, or a combination thereof.

In an example embodiment, the processing circuitry 202 may be configured to execute instructions stored in the memory 204 or otherwise accessible to the processing circuitry 202. Alternatively or additionally, the processing circuitry 202 may be configured to execute hard-coded functionality. As such, whether configured by hardware or software methods, or by a combination of hardware with software, the processing circuitry 202 may represent an entity (e.g., physically embodied in circuitry) capable of performing operations according to an embodiment of the present disclosure while configured accordingly. As another example, when the processing circuitry 202 is embodied as an executor of program code instructions, the instructions may specifically configure the processor to perform the operations described herein when the instructions are executed.

In some embodiments, the apparatus 200 may include input-output circuitry 206 that may, in turn, be in communication with processing circuitry 202 to provide output to the user and, in some embodiments, to receive input such as a command provided by the user. The input-output circuitry 206 may comprise a user interface, such as a graphical user interface (GUI), and may include a display that may include a web user interface, a GUI application, a mobile application, a client device, or any other suitable hardware or software. In some embodiments, the input-output circuitry 206 may also include a keyboard, a mouse, a joystick, a display device, a display screen, a touch screen, touch areas, soft keys, a microphone, a speaker, or other input-output mechanisms. The processing circuitry 202, input-output circuitry 206 (which may utilize the processing circuitry 202), or both may be configured to control one or more functions of one or more user interface elements through computer-executable program code instructions (e.g., software, firmware) stored in a non-transitory computer-readable storage medium (e.g., memory 204). Input-output circuitry 206 is optional and, in some embodiments, the apparatus 200 may not include input-output circuitry. For example, where the apparatus 200 does not interact directly with the user, the apparatus 200 may generate user interface data for display by one or more other devices with which one or more users directly interact and transmit the generated user interface data to one or more of those devices. For example, the apparatus 200, using user interface circuitry of the apparatus 200, may generate user interface data for display by one or more display devices and transmit the generated user interface data to those display devices.

The communications circuitry 208 may be any device or circuitry embodied in either hardware or a combination of hardware and software that is configured to receive or transmit data from or to a network or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. In some embodiments, the communication interface may include the circuitry for interacting with the antenna(s) to cause transmission of signals via the antenna(s) or to handle receipt of signals received via the antenna(s). These signals may be transmitted or received by the apparatus 200 using any of a number of Internet, Ethernet, cellular, satellite, or wireless technologies, such as IEEE 802.11, Code Division Multiple Access (CDMA), Global System for Mobiles (GSM), Universal Mobile Telecommunications System (UMTS), Long-Term Evolution (LTE), Bluetooth® v1.0 through v5.0, Bluetooth Low Energy (BLE), infrared wireless (e.g., IrDA), ultra-wideband (UWB), induction wireless transmission, Wi-Fi, near field communications (NFC), Worldwide Interoperability for Microwave Access (WiMAX), radio frequency (RF), RFID, or any other suitable technologies.

In some embodiments, communications circuitry 208 may comprise hardware components designed or configured to receive, from a user device, an electronic indication of a monitoring mode for an ultrasonic gas leak detection device. In some embodiments, the communications circuitry 208 may receive the electronic indication of the monitoring mode in response to a user using input-output circuitry 206 of a user device to select a monitoring mode from a list of monitoring modes (e.g., a list of monitoring modes comprising a standard mode and a focus mode) displayed in a graphical user interface provided by user interface circuitry of the apparatus 200. In some embodiments, the electronic indication of the monitoring mode may correspond to a standard mode or a focus mode.

The rotary position sensing circuitry 210 includes hardware components designed or configured to receive, process, generate, and transmit data, such as rotary position data. In some embodiments, the rotary position sensing circuitry 210 may be configured to a rotary position of a rotary selector of a handheld ultrasonic testing device based on any embodiment or combination of embodiments described with reference to any of FIGS. 1, 2, 3, 4, 5, and 6.

The testing mode determination circuitry 212 includes hardware components designed or configured to receive, process, generate, and transmit data, such as testing mode statuses. In some embodiments, the testing mode determination circuitry 212 may be configured to determine whether the rotary position of the rotary selector corresponds to a first testing mode (e.g., a test mode) for testing the ultrasonic gas leak detection device or a second testing mode (e.g., an alarm mode) for testing the ultrasonic gas leak detection device based on any embodiment or combination of embodiments described with reference to any of FIGS. 1, 2, 3, 4, 5, and 6.

The ultrasonic transduction circuitry 214 includes hardware components designed or configured to receive, process, generate, and transmit data, such as ultrasonic signals. In some embodiments, the ultrasonic transduction circuitry 214 may be configured to generate a first ultrasonic signal (e.g., a test mode ultrasonic signal) for testing the ultrasonic gas leak detection device based on any embodiment or combination of embodiments described with reference to any of FIGS. 1, 2, 3, 4, 5, and 6. In some embodiments, the ultrasonic transduction circuitry 214 may be configured to generate a second ultrasonic signal (e.g., an alarm mode ultrasonic signal) for testing the ultrasonic gas leak detection device based on any embodiment or combination of embodiments described with reference to any of FIGS. 1, 2, 3, 4, 5, and 6.

The audible transduction circuitry 216 includes hardware components designed or configured to receive, process, generate, and transmit data, such as audible signals. In some embodiments, the audible transduction circuitry 216 may be configured to generate a first audible signal (e.g., a test mode audible signal) for testing the ultrasonic gas leak detection device based on any embodiment or combination of embodiments described with reference to any of FIGS. 1, 2, 3, 4, 5, and 6. In some embodiments, the audible transduction circuitry 216 may be configured to generate a second audible signal (e.g., an alarm mode audible signal) for testing the ultrasonic gas leak detection device based on any embodiment or combination of embodiments described with reference to any of FIGS. 1, 2, 3, 4, 5, and 6.

The visual transduction circuitry 218 includes hardware components designed or configured to receive, process, generate, and transmit data, such as visual signals. In some embodiments, the visual transduction circuitry 218 may be configured to generate a first visual signal (e.g., a test mode visual signal) for testing the ultrasonic gas leak detection device based on any embodiment or combination of embodiments described with reference to any of FIGS. 1, 2, 3, 4, 5, and 6. In some embodiments, the visual transduction circuitry 218 may be configured to generate a second visual signal (e.g., an alarm mode visual signal) for testing the ultrasonic gas leak detection device based on any embodiment or combination of embodiments described with reference to any of FIGS. 1, 2, 3, 4, 5, and 6.

In some embodiments, each of the rotary position sensing circuitry 210, testing mode determination circuitry 212, ultrasonic transduction circuitry 214, audible transduction circuitry 216, and visual transduction circuitry 218 may include a separate processor, specially configured field programmable gate array (FPGA), application specific interface circuit (ASIC), or cloud utility to perform the above functions. In some embodiments, the hardware components described above with reference to rotary position sensing circuitry 210, testing mode determination circuitry 212, ultrasonic transduction circuitry 214, audible transduction circuitry 216, and visual transduction circuitry 218, may, for instance, utilize communications circuitry 208 or any suitable wired or wireless communications path to communicate with a user device, each other, or any other suitable circuitry or device.

In some embodiments, one or more of the rotary position sensing circuitry 210, testing mode determination circuitry 212, ultrasonic transduction circuitry 214, audible transduction circuitry 216, and visual transduction circuitry 218 may be hosted locally by the apparatus 200. In some embodiments, one or more of the rotary position sensing circuitry 210, testing mode determination circuitry 212, ultrasonic transduction circuitry 214, audible transduction circuitry 216, and visual transduction circuitry 218 may be hosted remotely (e.g., by one or more cloud servers) and thus need not physically reside on the apparatus 200. Thus, some or all of the functionality described herein may be provided by a remote circuitry. For example, the apparatus 200 may access one or more remote circuitries via any sort of networked connection that facilitates transmission of data and electronic information between the apparatus 200 and the remote circuitries. In turn, the apparatus 200 may be in remote communication with one or more of the rotary position sensing circuitry 210, testing mode determination circuitry 212, ultrasonic transduction circuitry 214, audible transduction circuitry 216, and visual transduction circuitry 218.

As described above and as will be appreciated based on this disclosure, embodiments of the present disclosure may be configured as systems, apparatuses, methods, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices. As will be appreciated, any computer program instructions and/or other type of code described herein may be loaded onto a computer, processor or other programmable apparatus's circuitry to produce a machine, such that the computer, processor, or other programmable circuitry that executes the code on the machine creates the means for implementing various functions, including those described herein.

The user device may be embodied by one or more computing devices or systems that also may include processing circuitry, memory, input-output circuitry, and communications circuitry. For example, a user device may be a laptop computer on which an app (e.g., a GUI application) is running or otherwise being executed by processing circuitry. In yet another example, a user device may be a smartphone on which an app (e.g., a webpage browsing app) is running or otherwise being executed by processing circuitry. As it relates to operations described in the present disclosure, the functioning of these devices may utilize components similar to the similarly named components described above with respect to FIG. 2. Additional description of the mechanics of these components is omitted for the sake of brevity. These device elements, operating together, provide the respective computing systems with the functionality necessary to facilitate the communication of data with the ultrasonic gas leak detector described herein.

Figure 3:
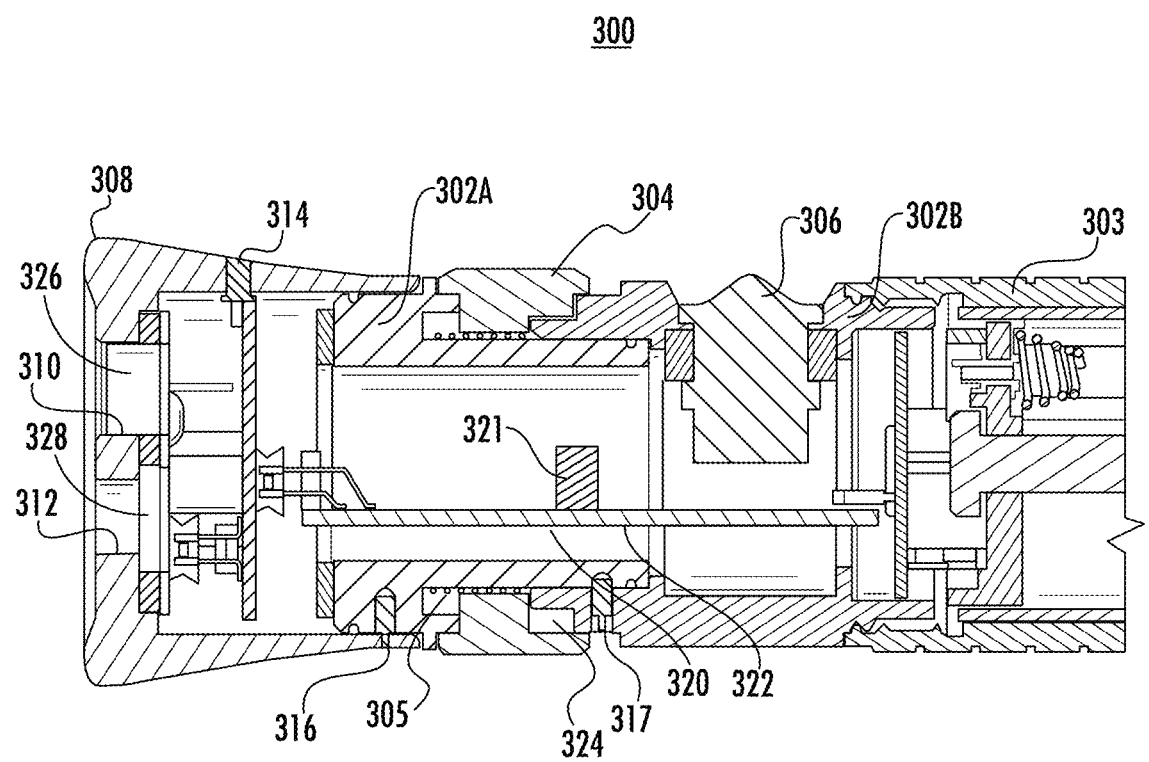
FIG. 3 illustrates an example cross-sectional view of an example portion of an example handheld ultrasonic testing device in accordance with some example embodiments described herein.

FIG. 3 illustrates an example cross-sectional view of an example handheld ultrasonic testing device 300 for testing an ultrasonic gas leak detection device in accordance with some example embodiments described herein. In some embodiments, the example handheld ultrasonic testing device 300 may be configured to test an ultrasonic gas leak detection device located up to 50 meters away from the example handheld ultrasonic testing device 300.

In some embodiments, the example handheld ultrasonic testing device 300 may comprise a housing 302 comprising an inner surface and an outer surface disposed opposite the inner surface. In some embodiments, the housing 302 may comprise anodized aluminum, plastic, or a combination thereof. In some embodiments, the electronic components and circuitries of the example handheld ultrasonic testing device 300 may be disposed and intrinsically sealed in the housing 302. In some embodiments, the housing 302 may be a two-part housing in which a first part of the housing 302 (e.g., a front part of the housing 302 as indicated by the first outer portion 302A of the outer surface of the housing 302) may be attached to a second part of the housing 302 (e.g., a rear part of the housing 302 as indicated by the second outer portion 302B of the outer surface of the housing 302) using a fastener 317 (e.g., a countersunk screw or bolt).

In some embodiments, the example handheld ultrasonic testing device 300 may further comprise a rotary selector 304 disposed around a first outer portion 302A of the outer surface of the housing 302. In some embodiments, the example handheld ultrasonic testing device 300 may further comprise a rotary selector spring 305 disposed around the first outer portion 302A of the housing 302 and an inner surface of the rotary selector 304. In some embodiments, the rotary selector 304 may be spring loaded by the rotary selector spring 305 to bias the rotary selector 304 towards the un-rotated rotary position, allow positive applied rotation in a counterclockwise direction to rotate the rotary selector 304 to the rotated rotary position, and, once the positively applied rotation ends, automatically return the rotary selector 304 to the un-rotated rotary position in a clockwise direction. In some embodiments, the rotary selector spring 305 may be configured to preload the rotary selector 304 such that the un-rotated rotary position of the rotary selector 304 corresponds to the first testing mode and the rotated rotary position of the rotary selector 304 corresponds to the second testing mode. In some embodiments, an angular difference between the un-rotated rotary position of the rotary selector and the rotated rotary position of the rotary selector may be about 90 degrees.

In some embodiments, the example handheld ultrasonic testing device 300 may further comprise a button 306 disposed through a first subportion of the second outer portion 302B of the outer surface of the housing 302. In some embodiments, the button 306 may be biased towards an un-depressed state, allow positive applied force in a downward direction to press the button 306 to the depressed state, and, once the positively applied force ends, automatically return the button 306 to the un-depressed state in an upward direction. In some embodiments, the example handheld ultrasonic testing device 300 may further comprise a flexible rubber grip disposed 303 around a second subportion of the second outer portion 302B of the outer surface of the housing 302 to provide for an improved gripping surface for the user's hand.

In some embodiments, the example handheld ultrasonic testing device 300 may further comprise a rotary position sensing device encompassed within a first inner portion of the inner surface of the housing 302. In some embodiments, the rotary position sensing device may be configured to determine a rotary position of the rotary selector 304. In some embodiments, the rotary position sensing device may comprise a Hall effect sensor 320 coupled to a Hall effect switch 321 via a substrate 322 (e.g., a PCB). In some embodiments, the example handheld ultrasonic testing device 300 may further comprise a rotary selector magnet 324 attached (e.g., using a two-part epoxy resin) to an inner surface of the rotary selector 304. In some embodiments, the Hall effect switch 321 may remain switched on when the Hall effect sensor 320 senses that the rotary selector magnet 324 of the rotary selector 304 is positioned at the un-rotated rotary position. In some embodiments, the Hall effect switch 321 may be switched off when the Hall effect sensor 320 senses that the rotary selector magnet 324 of the rotary selector 304 is positioned at a rotated rotary position. In some embodiments, the rotated rotary position may be about 90 degrees counterclockwise from the un-rotated rotary position. In some embodiments, the first testing mode may remain active while the Hall effect switch 321 is switched on, and the second testing mode may be activated when the Hall effect switch 321 is switched off to avoid unintended activation of the second testing mode by magnetic field noise from the environment.

In some embodiments, the example handheld ultrasonic testing device 300 may further comprise an ultrasonic transduction device 326 (e.g., an ultrasound transducer) disposed within a second inner portion of the inner surface of the housing 302. In some embodiments, the example handheld ultrasonic testing device 300 may further comprise an audible transduction device 328 (e.g., a piezoelectric buzzer) disposed within a third inner portion of the inner surface of the housing 302. In some embodiments, the example handheld ultrasonic testing device 300 may further comprise an visual transduction device 314 (e.g., one or more LEDs, such as a green LED, a red LED, any other suitable LED, or any combination thereof) disposed within a third inner portion of the inner surface of the housing 302 and visible through an aperture defined by the housing 302. In some embodiments, the ultrasonic transduction device 326, the audible transduction device 328, and the visual transduction device 314 may respectively provide ultrasonic (e.g., above the limit of human hearing, such as above 20 kHz), audible (e.g., within the audible limits of human hearing, such as between about 20 Hz and about 20 kHz), and visual (e.g., within the visible limits of human sight, such as between about 380 nanometers (nm) and about 740 nm) signals corresponding to the first testing mode and the second testing mode.

In some embodiments, the example handheld ultrasonic testing device 300 may comprise a front cap 308 disposed at a front end of the housing 302. In some embodiments, the front cap 308 may comprise a square-shaped cross-sectional area to allow the example handheld ultrasonic testing device 300 to remain rotationally stationary (e.g., to prevent the example handheld ultrasonic testing device 300 from rolling) when placed on a surface such as a shelf, desk, or table. In some embodiments, the front cap 308 may define a first aperture 310 acoustically coupled to the ultrasonic transduction device 326 and a second aperture 312 acoustically coupled to the audible transduction device 328. In some embodiments, the front cap 308 may be attached to the housing 302 using a fastener 316 (e.g., a countersunk screw or bolt).

In some embodiments, the example handheld ultrasonic testing device 300 may provide for two modes of operation—a first testing mode (e.g., a test mode) and a second testing mode (e.g., an alarm mode)—as described in greater detail above with reference to FIG. 1.

Figure 4:
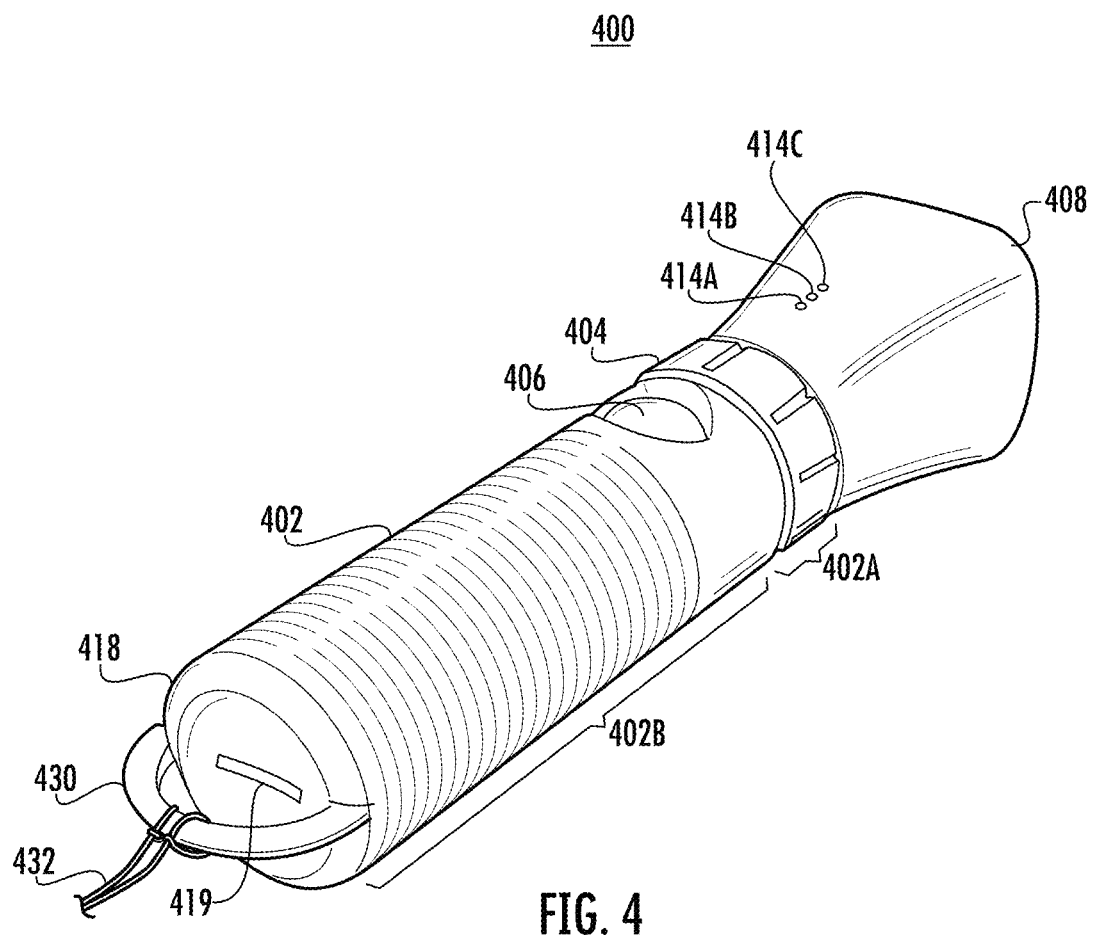
FIG. 4 illustrates an example isometric view of an example handheld ultrasonic testing device in accordance with some example embodiments described herein.

FIG. 4 illustrates an example isometric view of an example handheld ultrasonic testing device 400 for testing an ultrasonic gas leak detection device in accordance with some example embodiments described herein. In some embodiments, the example handheld ultrasonic testing device 400 may be configured to test an ultrasonic gas leak detection device located up to 50 meters away from the example handheld ultrasonic testing device 400.

In some embodiments, the example handheld ultrasonic testing device 400 may comprise a housing 402 comprising an inner surface and an outer surface disposed opposite the inner surface. In some embodiments, the housing 402 may comprise anodized aluminum, plastic, or a combination thereof. In some embodiments, the electronic components and circuitries of the example handheld ultrasonic testing device 400 may be disposed and intrinsically sealed in the housing 402.

In some embodiments, the example handheld ultrasonic testing device 400 may further comprise a rotary selector 404 disposed around a first outer portion 402A of the outer surface of the housing 402. In some embodiments, the example handheld ultrasonic testing device 400 may further comprise a rotary selector spring disposed around the first outer portion 402A of the housing 402 and an inner surface of the rotary selector 404. In some embodiments, the rotary selector 404 may be spring loaded by the rotary selector spring to bias the rotary selector 404 towards the un-rotated rotary position, allow positive applied rotation in a counterclockwise direction to rotate the rotary selector 404 to the rotated rotary position, and, once the positively applied rotation ends, automatically return the rotary selector 404 to the un-rotated rotary position in a clockwise direction. In some embodiments, the rotary selector spring may be configured to preload the rotary selector 404 such that the un-rotated rotary position of the rotary selector 404 corresponds to the first testing mode and the rotated rotary position of the rotary selector 404 corresponds to the second testing mode. In some embodiments, an angular difference between the un-rotated rotary position of the rotary selector and the rotated rotary position of the rotary selector may be about 90 degrees.

In some embodiments, the example handheld ultrasonic testing device 400 may further comprise a button 406 disposed through a second outer portion 402B of the outer surface of the housing 402. In some embodiments, the button 406 may be biased towards an un-depressed state, allow positive applied force in a downward direction to press the button 406 to the depressed state, and, once the positively applied force ends, automatically return the button 406 to the un-depressed state in an upward direction. In some embodiments, the second outer portion 402B of the outer surface of the housing 402 may be textured or machined to provide for an improved gripping surface for the user's hand.

In some embodiments, the example handheld ultrasonic testing device 400 may further comprise a rotary position sensing device encompassed within a first inner portion of the inner surface of the housing 402. In some embodiments, the rotary position sensing device may be configured to determine a rotary position of the rotary selector 404. In some embodiments, the rotary position sensing device may comprise a Hall effect sensor coupled to a Hall effect switch via a substrate (e.g., a PCB). In some embodiments, the example handheld ultrasonic testing device 400 may further comprise a rotary selector magnet attached (e.g., using a two-part epoxy resin) to an inner surface of the rotary selector 404. In some embodiments, the Hall effect switch may remain switched on when the Hall effect sensor senses that the rotary selector magnet of the rotary selector 404 is positioned at the un-rotated rotary position. In some embodiments, the Hall effect switch may be switched off when the Hall effect sensor senses that the rotary selector magnet of the rotary selector 404 is positioned at a rotated rotary position. In some embodiments, the rotated rotary position may be about 90 degrees counterclockwise from the unrotated rotary position. In some embodiments, the first testing mode may remain active while the Hall effect switch is switched on, and the second testing mode may be activated when the Hall effect switch is switched off to avoid unintended activation of the second testing mode by magnetic field noise from the environment.

In some embodiments, the example handheld ultrasonic testing device 400 may further comprise an ultrasonic transduction device (e.g., an ultrasound transducer) disposed within a second inner portion of the inner surface of the housing 402. In some embodiments, the example handheld ultrasonic testing device 400 may further comprise an audible transduction device (e.g., a piezoelectric buzzer) disposed within a third inner portion of the inner surface of the housing 402. In some embodiments, the example handheld ultrasonic testing device 400 may further comprise an visual transduction device 414 comprising a first LED 414A (e.g., a green LED), a second LED 414B (e.g., a yellow LED), and a third LED 414C (e.g., a red LED) disposed within a third inner portion of the inner surface of the housing 402 and visible through a respective aperture defined by the housing 402. In some embodiments, the visual transduction device 414 may comprise a single LED configured to emit light at two or more wavelengths, such as green, red, a combination of green and red (e.g., orange), and any other suitable wavelength. In some embodiments, the ultrasonic transduction device, the audible transduction device, and the visual transduction device 414 may respectively provide ultrasonic (e.g., above the limit of human hearing, such as above 20 kHz), audible (e.g., within the audible limits of human hearing, such as between about 20 Hz and about 20 kHz), and visual (e.g., within the visible limits of human sight, such as between about 380 nanometers (nm) and about 740 nm) signals corresponding to the first testing mode and the second testing mode.

In some embodiments, the example handheld ultrasonic testing device 400 may comprise a front cap 408 disposed at a front end of the housing 402. In some embodiments, the front cap 408 may comprise a square-shaped cross-sectional area to allow the example handheld ultrasonic testing device 400 to remain rotationally stationary (e.g., to prevent the example handheld ultrasonic testing device 400 from rolling) when placed on a surface such as a shelf, desk, or table. In some embodiments, the front cap 408 may define a first aperture acoustically coupled to the ultrasonic transduction device and a second aperture acoustically coupled to the audible transduction device. In some embodiments, the front cap 408 may be attached to the housing 402 using a fastener (e.g., a countersunk screw or bolt).

In some embodiments, the example handheld ultrasonic testing device 400 may comprise an end cap 418 disposed at a back end of the housing 402. In some embodiments, the end cap 418 may be removably attached to the housing 102. In some embodiments, the example handheld ultrasonic testing device 400 may comprise a removable battery pack disposed within a fourth inner portion of the inner surface of the housing 402. In some embodiments, the removable battery pack may be removable from the housing 402 after removal of the end cap 418 from the housing 402. In some embodiments, the end cap may comprise a socket 419 (e.g., a hexagon-shaped socket, a slot-shaped socket). In some embodiments, the end cap 418 may be removable from the housing 402 only by operation of the socket 419 (e.g., by rotating the socket by about 90 degrees, 720 degrees, or any other suitable amount). In some embodiments, the end cap 418 may comprise a rotatable structure 430 to which a lanyard 432 may be attached.

In some embodiments, the example handheld ultrasonic testing device 400 may provide for two modes of operation—a first testing mode (e.g., a test mode) and a second testing mode (e.g., an alarm mode)—as described in greater detail above with reference to FIG. 1.

In some embodiments, the handheld ultrasonic testing device disclosed herein may comprise any combination of components, structures, and features discussed with reference to example handheld ultrasonic testing device 100, apparatus 200, example handheld ultrasonic testing device 300, or example handheld ultrasonic testing device 400, including the addition or omission of components, structures, and features.

Having described specific components of example devices involved in the present disclosure, example procedures for providing a handheld ultrasonic testing device for testing an ultrasonic gas leak detection device are described below in connection with FIGS. 5 and 6.

Figure 5:
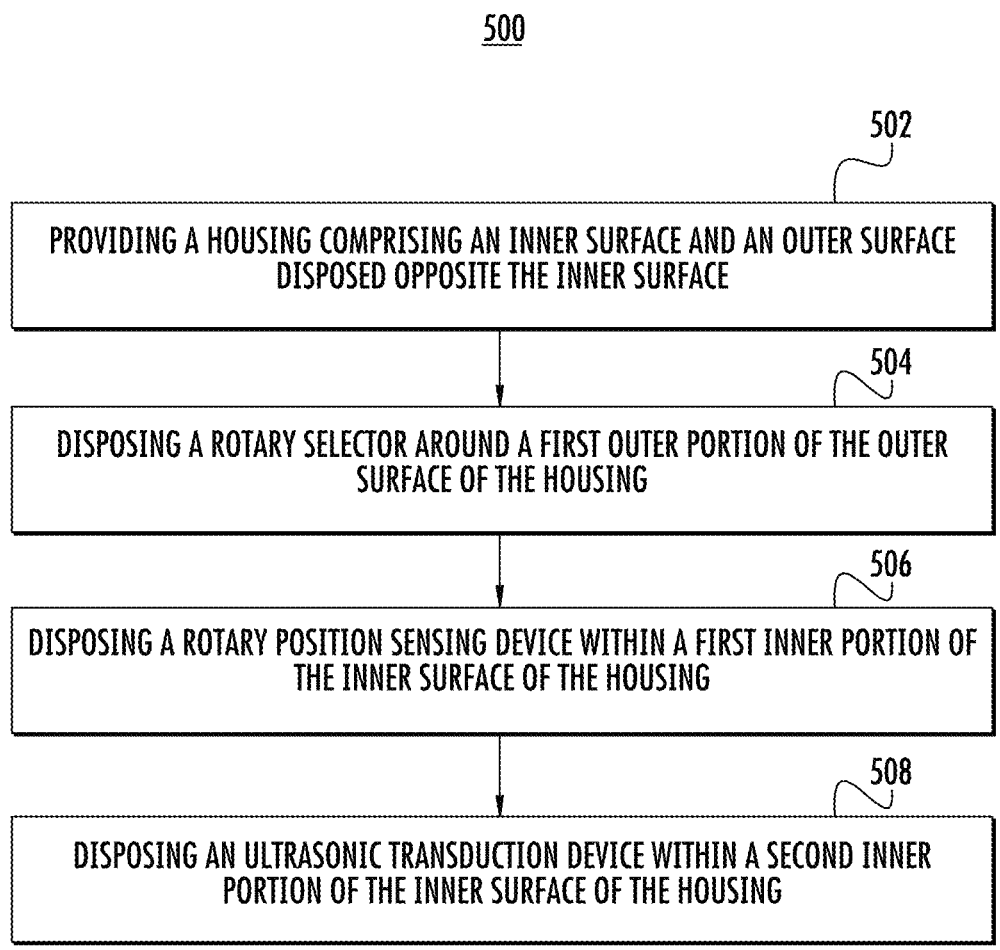
FIG. 5 illustrates an example flowchart illustrating an example method in accordance with some example embodiments described herein.

FIG. 5 illustrates an example flowchart 500 that contains example operations for manufacturing or otherwise providing an apparatus (e.g., apparatus 100, 200, 300, 400) for testing an ultrasonic gas leak detection device according to some example embodiments described herein.

As shown by operation 502, the example flowchart 500 may begin by providing a housing (e.g., housing 102, 302, 402) comprising an inner surface and an outer surface disposed opposite the inner surface.

As shown by operation 504, the example flowchart 500 may proceed to disposing a rotary selector (e.g., rotary selector 104, 304, 404) around a first outer portion (e.g., first outer portion 102A, 302A, 402A) of the outer surface of the housing.

As shown by operation 506, the example flowchart 500 may proceed to disposing a rotary position sensing device (e.g., a rotary position sensing device comprising a Hall effect sensor 320 coupled to a Hall effect switch 321 via a substrate 322) within a first inner portion of the inner surface of the housing. The rotary position sensing device may be configured to determine (e.g., using rotary position sensing circuitry 210) a rotary position of the rotary selector. In some embodiments, the rotary position of the rotary selector may correspond to a first testing mode for testing the ultrasonic gas leak detection device or a second testing mode for testing the ultrasonic gas leak detection device.

As shown by operation 508, the example flowchart 500 may proceed to disposing an ultrasonic transduction device (e.g., ultrasonic transduction device 326) within a second inner portion of the inner surface of the housing. In some embodiments, the ultrasonic transduction device may be configured to generate a first ultrasonic signal (e.g., a test mode ultrasonic signal) for testing the ultrasonic gas leak detection device in response to a first determination by the rotary position sensing device (e.g., using the testing mode determination circuitry 212) that the rotary position of the rotary selector corresponds to the first testing mode and, optionally, that a button (e.g., button 106, 306, 406) of the handheld ultrasonic testing device is in a depressed state (e.g., depressed state 106B shown in FIG. 1B). In some embodiments, the ultrasonic transduction device may be further configured to generate a second ultrasonic signal (e.g., an alarm mode ultrasonic signal) for testing the ultrasonic gas leak detection device in response to a second determination by the rotary position sensing device (e.g., using the testing mode determination circuitry 212) that the rotary position of the rotary selector corresponds to the second testing mode and, optionally, that a button of the handheld ultrasonic testing device is in the depressed state (e.g., depressed state 106B shown in FIG. 1C). In some embodiments, the second ultrasonic signal may different from the first ultrasonic signal as described herein.

Optionally (not shown in FIG. 5), the method may further comprise disposing a spring around the first outer portion of the housing. In some embodiments, the spring may be configured to preload the rotary selector such that an un-rotated rotary position of the rotary selector corresponds to the first testing mode and a rotated rotary position of the rotary selector corresponds to the second testing mode. In some embodiments, an angular difference between the un-rotated rotary position of the rotary selector and the rotated rotary position of the rotary selector may be about 90 degrees.

Optionally, the method may further comprise disposing a button (e.g., button 106, 306, 406) through a second outer portion (e.g., second outer portion 102B, 302B, 402B) of the outer surface of the housing.

Optionally, the method may further comprise disposing a front cap (e.g., front cap 108, 308, 408) at a front end of the housing. In some embodiments, the front cap may comprise a square-shaped cross-sectional area to prevent the apparatus from rolling and allow the apparatus to remain rotationally stationary when placed on a surface such as a shelf, desk, or table.

Optionally, the method may further comprise disposing an end cap (e.g., end cap 118, 418) at a back end of the housing. In some embodiments, the end cap may be removably attached to the housing.

Optionally, the method may further comprise disposing a battery pack (e.g., a removable battery pack) within a third inner portion of the inner surface of the housing. In some embodiments, the battery pack may be removable from the housing after removal of the end cap from the housing. In some embodiments, the end cap may comprise a socket (e.g., socket 419). In some embodiments, the end cap may be removable from the housing only by operation of the socket (e.g., by rotating the socket by about 90 degrees, 720 degrees, or any other suitable amount).

In some embodiments, operations 502, 504, 506, and 508 may not necessarily occur in the order depicted in FIG. 5. In some embodiments, one or more of the operations depicted in FIG. 5 may occur substantially simultaneously. In some embodiments, one or more additional operations may be involved before, after, or between any of the operations shown in FIG. 5.

Figure 6:
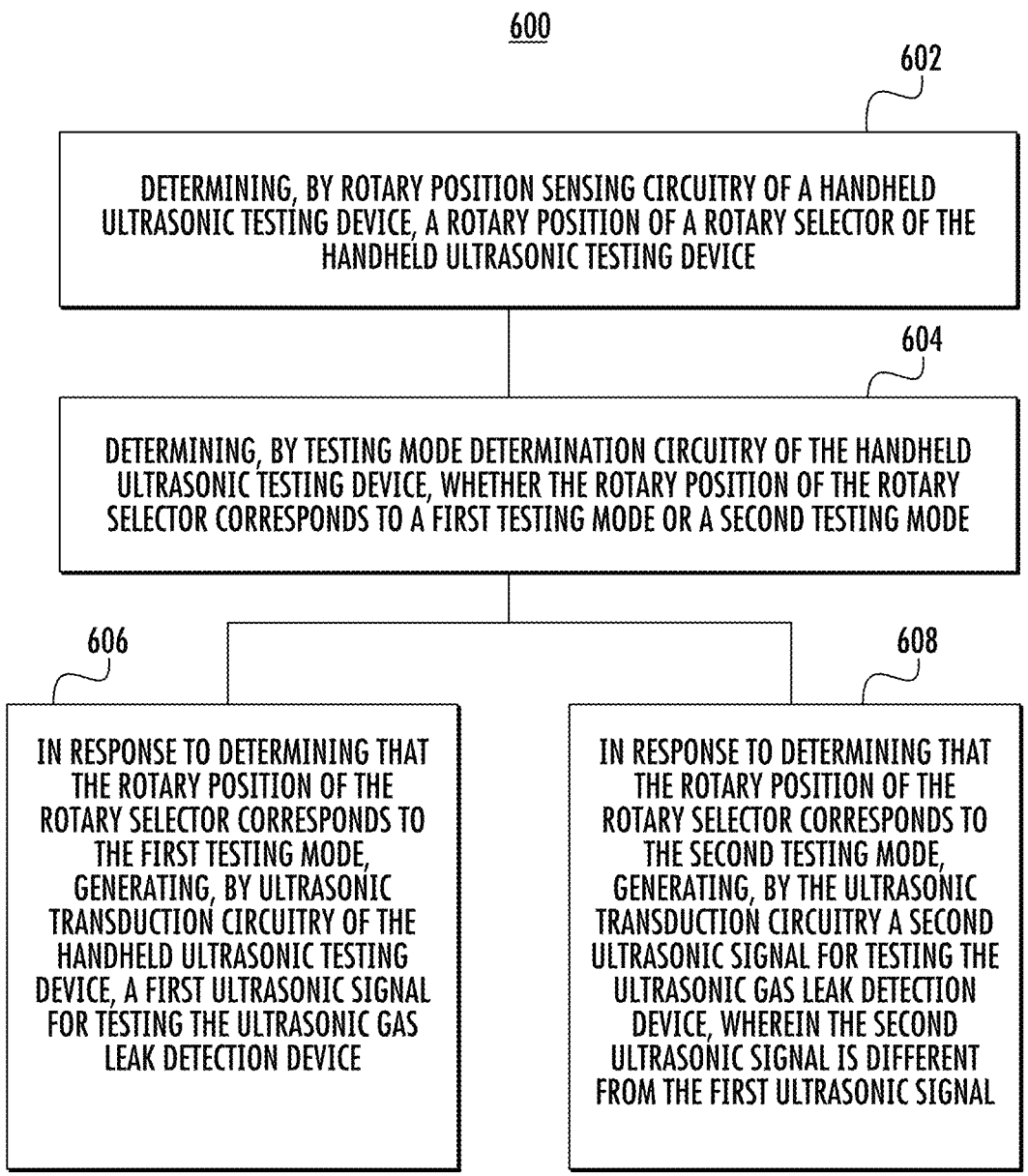
FIG. 6 illustrates an example flowchart illustrating another example method in accordance with some example embodiments described herein.

FIG. 6 illustrates an example flowchart 600 that contains example operations for testing an ultrasonic gas leak detection device according to some example embodiments described herein. The operations described in connection with FIG. 6 may, for example, be performed by one or more components described with reference to example handheld ultrasonic testing device 100 shown in FIG. 1, example handheld ultrasonic testing device 300 shown in FIG. 3, or example handheld ultrasonic testing device 400 shown in FIG. 4; by apparatus 200 shown in FIG. 2 (e.g., by or through the use of one or more of processing circuitry 202, memory 204, input-output circuitry 206, communications circuitry 208, rotary position sensing circuitry 210, testing mode determination circuitry 212, ultrasonic transduction circuitry 214, audible transduction circuitry 216, visual transduction circuitry 218, any other suitable circuitry, and any combination thereof); by any other component described herein; or by any combination thereof.

As shown by operation 602, the apparatus 200 includes means, such as rotary position sensing circuitry 210 or the like, for determining a rotary position of a rotary selector (e.g., rotary selector 104, 304, 404) of a handheld ultrasonic testing device (e.g., handheld ultrasonic testing device 100, 300, 400) as described herein.

As shown by operation 604, the apparatus 200 includes means, such as testing mode determination circuitry 212 or the like, for determining whether the rotary position of the rotary selector corresponds to a first testing mode (e.g., a test mode) for testing the ultrasonic gas leak detection device or a second testing mode (e.g., an alarm mode) for testing the ultrasonic gas leak detection device as described herein.

As shown by operation 606, the apparatus 200 includes means, such as ultrasonic transduction circuitry 214 or the like, for generating a first ultrasonic signal (e.g., a test mode ultrasonic signal) for testing the ultrasonic gas leak detection device as described herein. In some embodiments, the ultrasonic transduction circuitry 214 may generate the first ultrasonic signal in response to determining that the rotary position of the rotary selector corresponds to the first testing mode (e.g., un-rotated rotary position 104A shown in FIG. 1B) and that a button (e.g., button 106, 306, 406) of the handheld ultrasonic testing device is in a depressed state (e.g., depressed state 106B shown in FIG. 1B) as described herein.

As shown by operation 608, the apparatus 200 includes means, such as ultrasonic transduction circuitry 214 or the like, for generating a second ultrasonic signal (e.g., an alarm mode ultrasonic signal) for testing the ultrasonic gas leak detection device as described herein. In some embodiments, the second ultrasonic signal is different from the first ultrasonic signal as described herein. In some embodiments, the ultrasonic transduction circuitry 214 may generate the second ultrasonic signal in response to determining that the rotary position of the rotary selector corresponds to the second testing mode (e.g., rotated rotary position 104B shown in FIG. 1C) and that the button of the handheld ultrasonic testing device is in the depressed state (e.g., depressed state 106B shown in FIG. 1C) as described herein.

In some embodiments, operations 602, 604, 606, and 608 may not necessarily occur in the order depicted in FIG. 6. In some embodiments, one or more of the operations depicted in FIG. 6 may occur substantially simultaneously. In some embodiments, one or more additional operations may be involved before, after, or between any of the operations shown in FIG. 6.

As described above and with reference to FIGS. 1, 2, 3, 4 and 5, example embodiments of the present disclosure thus provide for a portable, handheld ultrasonic testing device for testing an ultrasonic gas leak detection device. Thus, the handheld ultrasonic testing device disclosed herein may safely test ultrasonic gas leak detection devices by: providing an intrinsically safe housing that encloses and intrinsically seals various electrical components and circuitries; providing a test mode of operation that a user may activate using one hand (e.g., by pressing a button); providing an alarm mode of operation for a handheld ultrasonic testing device that a user may activate only using two hands (e.g., by rotating a rotary selector and pressing a button) to avoid unconscious or unintended activation of the alarm state of the ultrasonic gas leak detection device; and providing a removable battery pack for the handheld ultrasonic testing device.

FIGS. 5 and 6 thus illustrate example flowcharts describing operations performed in accordance with example embodiments of the present disclosure. It will be understood that each operation of the flowcharts, and combinations of operations in the flowcharts, may be implemented by various means, such as devices comprising hardware, firmware, one or more processors, and/or circuitry associated with execution of software comprising one or more computer program instructions. For example, one or more of the procedures described above may be performed by execution of program code instructions. In this regard, the program code instructions that, when executed, cause performance of the procedures described above may be stored by a non-transitory computer-readable storage medium (e.g., memory 204) of a computing apparatus (e.g., apparatus 200) and executed by a processor (e.g., processing circuitry 202) of the computing apparatus. In this regard, the computer program instructions which embody the procedures described above may be stored by a memory of an apparatus employing an embodiment of the present disclosure and executed by a processor of the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts 500 and 600. When executed, the instructions stored in the computer-readable storage memory produce an article of manufacture configured to implement the various functions specified in the flowcharts 500 and 600. The program code instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the operations of flowcharts 500 and 600. Moreover, execution of a computer or other processing circuitry to perform various functions converts the computer or other processing circuitry into a particular machine configured to perform an example embodiment of the present disclosure.

The flowchart operations described with reference to FIGS. 5 and 6 support combinations of means for performing the specified functions and combinations of operations for performing the specified functions. It will be understood that one or more operations of the flowchart, and combinations of operations in the flowchart, may be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," and similar words are not intended to limit the order of the steps; these words are simply used to guide the reader through the description of the methods. Further, any reference to claim elements in the singular, for example, using the articles "a," "an" or "the," is not to be construed as limiting the element to the singular and may, in some instances, be construed in the plural.

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatus and systems described herein, various other components may be used in conjunction with the components and structures disclosed herein. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying drawings, and in some cases one or more of the steps depicted may occur substantially simultaneously, or additional steps may be involved. Although specific terms are employed herein, they are used in a generic and descriptive sense only and not for purposes of limitation.

The invention claimed is:

1. A method of manufacturing an apparatus for testing an ultrasonic gas leak detection device, the method comprising:
disposing a rotary selector around a housing, wherein the rotary selector is configurable between a first rotary position and a second rotary position, wherein the rotary selector is biased to the first rotary position;
disposing a rotary position sensing device within the housing, wherein the rotary position sensing device is configured to determine a rotary position of the rotary selector, and wherein the first rotary position of the rotary selector corresponds to a first testing mode for testing the ultrasonic gas leak detection device and the second rotary position of the rotary selector corresponds to a second testing mode for testing the ultrasonic gas leak detection device;
disposing a button on the housing, wherein the button is configurable between an undepressed state and a depressed state, wherein the button is biased to the undepressed state; and
disposing an ultrasonic transduction device within the housing, wherein the ultrasonic transduction device is configured to:
in response to a first determination by the rotary position sensing device that the rotary position of the rotary selector is the first rotary position corresponding to the first testing mode and the button simultaneously corresponds to the depressed state, generate a first ultrasonic signal for testing the ultrasonic gas leak detection device, and
in response to a second determination by the rotary position sensing device that the rotary position of the rotary selector is the second rotary position corresponding to the second testing mode and the button simultaneously corresponds to the depressed state, generate a second ultrasonic signal for testing the ultrasonic gas leak detection device, wherein the second ultrasonic signal is different from the first ultrasonic signal.

2. The method of manufacturing of claim 1, wherein the housing comprises an inner surface and an outer surface disposed opposite the inner surface, wherein the rotary selector is disposed around an outer portion of the outer surface of the housing, wherein the rotary position sensing device is encompassed within a first inner portion of the inner surface of the housing, and wherein the ultrasonic transduction device is encompassed within a second inner portion of the inner surface of the housing.

3. The method of manufacturing of claim 1, further comprising:
disposing a spring around a first outer portion of the housing and an inner surface of the rotary selector.

4. The method of manufacturing of claim 3, wherein the spring is configured to preload the rotary selector, wherein an un-rotated rotary position of the rotary selector corresponds to the first testing mode, and wherein a rotated rotary position of the rotary selector corresponds to the second testing mode.

5. The method of manufacturing of claim 4, wherein an angular difference between the un-rotated rotary position of the rotary selector and the rotated rotary position of the rotary selector is about 90 degrees.

6. The method of manufacturing of claim 1, further comprising:
disposing a front cap at a front end of the housing, the front cap comprising a square-shaped cross-sectional area.

7. The method of manufacturing of claim 1, further comprising:
disposing an end cap at a back end of the housing.

8. The method of manufacturing of claim 7, further comprising:
disposing a battery within the housing.

9. The method of manufacturing of claim 8, wherein the end cap is removably attached to the housing, and wherein the battery is removable from the housing after removal of the end cap from the housing.

10. The method of manufacturing of claim 7, wherein the end cap comprises a socket, and wherein the end cap is removable from the housing only by operation of the socket.

11. A method for testing an ultrasonic gas leak detection device, the method comprising:
determining, by a rotary position sensing circuitry of a handheld ultrasonic testing device, a rotary position of a rotary selector of the handheld ultrasonic testing device, wherein the rotary selector is configurable between a first rotary position and a second rotary position;
determining a state associated with a button configurable between an undepressed state and a depressed state, wherein the button is biased to the undepressed state;
determining, by testing mode determination circuitry of the handheld ultrasonic testing device, whether the rotary position of the rotary selector corresponds to the first rotary position or the second rotary position;
in response to determining that the rotary position of the rotary selector is the first rotary position corresponding to a first testing mode and the button simultaneously corresponds to the depressed state, generating, by ultrasonic transduction circuitry of the handheld ultrasonic testing device, a first ultrasonic signal for testing the ultrasonic gas leak detection device; and
in response to determining that the rotary position of the rotary selector is the second rotary position corresponding to a second testing mode and the button simultaneously corresponds to the depressed state, generating, by the ultrasonic transduction circuitry, a second ultrasonic signal for testing the ultrasonic gas leak detection device, wherein the second ultrasonic signal is different from the first ultrasonic signal.

12. The method of claim 11, further comprising:
generating, by the ultrasonic transduction circuitry, the first ultrasonic signal in response to a one-handed operation of the handheld ultrasonic testing device by a user of the handheld ultrasonic testing device.

13. The method of claim 11, further comprising:
generating, by the ultrasonic transduction circuitry, the second ultrasonic signal only in response to a two-handed operation of the handheld ultrasonic testing device by a user of the handheld ultrasonic testing device.

14. The method of claim 11, wherein the first ultrasonic signal is configured to test the ultrasonic gas leak detection device without causing the ultrasonic gas leak detection device to activate a safety shutdown system in communication with the ultrasonic gas leak detection device.

15. The method of claim 11, wherein the second ultrasonic signal is configured to test the ultrasonic gas leak detection device by causing the ultrasonic gas leak detection device to activate a safety shutdown system in communication with the ultrasonic gas leak detection device.

16. The method of claim 11, wherein a first modulation of the first ultrasonic signal is different than a second modulation of the second ultrasonic signal.

17. The method of claim 11, wherein the rotary selector is configured to rotate towards the second rotary position in response to an applied rotational force.

18. The method of claim 17, wherein the rotary selector is further configured to automatically return to the first rotary position in an instance in which the applied rotational force is removed.

19. The method of claim 11, wherein the button is configured to move toward the depressed state in response to an applied force.

20. The method of claim 19, wherein the button is further configured to automatically return to the undepressed state in an instance in which the applied force is removed.

* * * * *